US008499191B2

United States Patent
Shimada et al.

(10) Patent No.: US 8,499,191 B2
(45) Date of Patent: Jul. 30, 2013

(54) FAILURE RECOVERY METHOD FOR INFORMATION PROCESSING SERVICE AND VIRTUAL MACHINE IMAGE GENERATION APPARATUS

(75) Inventors: Akio Shimada, Yokohama (JP); Masakuni Agetsuma, Tokyo (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 13/002,957

(22) PCT Filed: Dec. 17, 2010

(86) PCT No.: PCT/JP2010/007324
§ 371 (c)(1), (2), (4) Date: Jan. 6, 2011

(87) PCT Pub. No.: WO2012/081059
PCT Pub. Date: Jun. 21, 2012

(65) Prior Publication Data
US 2012/0159232 A1   Jun. 21, 2012

(51) Int. Cl.
G06F 11/00   (2006.01)
(52) U.S. Cl.
USPC ............................................. 714/4.11
(58) Field of Classification Search
USPC ............................................. 714/4.11
See application file for complete search history.

(56) References Cited

U.S. PATENT DOCUMENTS

| 7,143,307 | B1  |   | 11/2006 | Witte et al.        |        |
|-----------|-----|---|---------|---------------------|--------|
| 8,156,490 | B2  | * | 4/2012  | Bozek et al.        | 718/1  |
| 8,185,776 | B1  | * | 5/2012  | Gentes et al.       | 714/4.11 |
| 2001/0037473 | A1 |   | 11/2001 | Matsuura et al.     |        |
| 2004/0172574 | A1 | * | 9/2004  | Wing et al.         | 714/4  |
| 2005/0108593 | A1 | * | 5/2005  | Purushothaman et al.| 714/4  |
| 2007/0174658 | A1 | * | 7/2007  | Takamoto et al.     | 714/4  |
| 2008/0016387 | A1 | * | 1/2008  | Bensinger           | 714/4  |
| 2008/0126834 | A1 |   | 5/2008  | Sankaran et al.     |        |

FOREIGN PATENT DOCUMENTS

JP   2008-305353   12/2008

OTHER PUBLICATIONS

PCT International Search Report on application No. PCT/JP2010/007324 dated Sep. 30, 2011; 4 pages.

* cited by examiner

Primary Examiner — Yolanda L Wilson
(74) Attorney, Agent, or Firm — Foley & Lardner LLP

(57) ABSTRACT

An information processing service is allowed to be immediately recovered from failure without clustering information apparatuses that provide an information processing service. A failure recovery method for an information processing service provided by an information apparatus, the method includes: preparing a virtual machine image generation apparatus which generates a virtual machine image, and a virtual machine execution apparatus which runs a virtual machine based on the virtual machine image; generating and storing, by the virtual machine image generation apparatus, the virtual machine image based on system data and hardware configuration information which enable implementation of the information processing service at a time of normal operation of the information processing service; and running, by the virtual machine execution apparatus, a virtual machine which provides a function of the information processing service based on the virtual machine image when a failure occurs in the information processing service.

11 Claims, 24 Drawing Sheets

Fig. 21

STORAGE FILE LIST

| FILE SERVER IDENTIFIER | PATH ON BACKUP SERVER | PATH ON FILE SERVER |
|---|---|---|
| 001 | /001/home/user1/doc/aaa.doc | /home/user1/doc/aaa.doc |
| 001 | /001/home/user1/doc/bbb.txt | /home/user1/doc/bbb.txt |
| 001 | /001/home/user2/ccc.pdf | /home/user2/doc/ccc.pdf |
| 001 | /001/home/user1/image/ddd.jpg | /home/user1/image/ddd.jpg |
| 001 | /001/home/user3/image/eee.jpg | /home/user3/image/eee.jpg |
| 001 | /001/home/user3/music/fff.mp3 | /home/user2/music/fff.mp3 |
| 002 | /002/home/user1/doc/aaa.pdf | /home/user1/doc/aaa.pdf |
| 002 | /002/home/user2/image/bbb.png | /home/user2/image/bbb.png |
| 002 | /002/home/user2/image/ccc.bmp | /home/user2/image/ccc.bmp |
| 002 | /002/home/user1/music/ddd.wav | /home/user1/music/ddd.wav |

1902    1903    1904    1505

FAILURE RECOVERY METHOD FOR INFORMATION PROCESSING SERVICE AND VIRTUAL MACHINE IMAGE GENERATION APPARATUS

TECHNICAL FIELD

The present invention relates to a failure recovery method for an information processing service and a virtual machine image generation apparatus.

BACKGROUND ART

With recent progress of computer-related technology, a form of using information processing services is widespread in which the information processing services provided by information apparatuses installed at remote sites are used by clients. One of the known technologies that improves availability of such information processing service is a technology of clustering information apparatuses (for example, see PTL 1).

CITATION LIST

Patent Literature

PTL 1: Japanese Patent Application Laid-open Publication No. 2008-305353

SUMMARY OF INVENTION

Technical Problem

This technology enables continuous provision of an information processing service to a client by: preparing a special standby information apparatus in addition to a main information apparatus that provides information processing services; and causing the standby information apparatus to take over the information processing in execution from the main information apparatus when the main information apparatus is disabled to provide the information processing service due to occurrence of a failure or the like.

For clustering of information apparatuses, the main information apparatus and additionally one or more special standby information apparatuses are required to be prepared and always be in operation. Thus, the cost for introducing such apparatuses and related running cost are high. Moreover, the administration cost is also high because a single information processing service is operated by two or more information apparatuses. Cumbersome administrative works are required such as configuring software for clustering the information apparatuses, preparing the IP addresses of the standby information apparatuses, and setting up a heart beat LAN to monitor a hardware failure.

In order to avoid such disadvantages of the clustering, information apparatuses may not be clustered. However, if an information apparatus prepared to provide an information processing service without clustering becomes disabled to provide the information processing service due to occurrence of a failure in the hardware of the information apparatus, the provision of the information processing service is halted over a time period until completion of administrative works such as procurement of a new information apparatus, installation of an operating system (OS) and application programs, and reconfiguration of the system.

The present invention has been made in view of such background, and it is an object of the invention to provide a failure recovery method for an information processing service and a virtual machine image generation apparatus which are capable of immediately recovering an information processing service from failure, without clustering information apparatuses that provide the information processing service.

Solution to Problem

A technique for solving the problem is a failure recovery method for an information processing service provided by an information apparatus, the method including preparing a virtual machine image generation apparatus which generates a virtual machine image, and a virtual machine execution apparatus which runs a virtual machine based on the virtual machine image. The virtual machine image generation apparatus generates and stores the virtual machine image based on system data and hardware configuration information which enable implementation of the information processing service at a time of normal operation of the information processing service. The virtual machine execution apparatus runs a virtual machine which provides a function of the information processing service based on the virtual machine image when a failure occurs in the information processing service.

In addition, the problems disclosed by this application and their solutions will be made apparent by the descriptions in the Description of Embodiments and the drawings.

ADVANTAGEOUS EFFECTS OF INVENTION

According to the present invention, an information processing service with hardware failure can be immediately recovered from failure without clustering information apparatuses that provide the information processing service.

BRIEF DESCRIPTION OF DRAWINGS

FIG. 21 is a diagram showing a storage file list according to the embodiment.

DESCRIPTION OF EMBODIMENTS

==First Embodiment==
<Entire Configuration<

Figure 1:
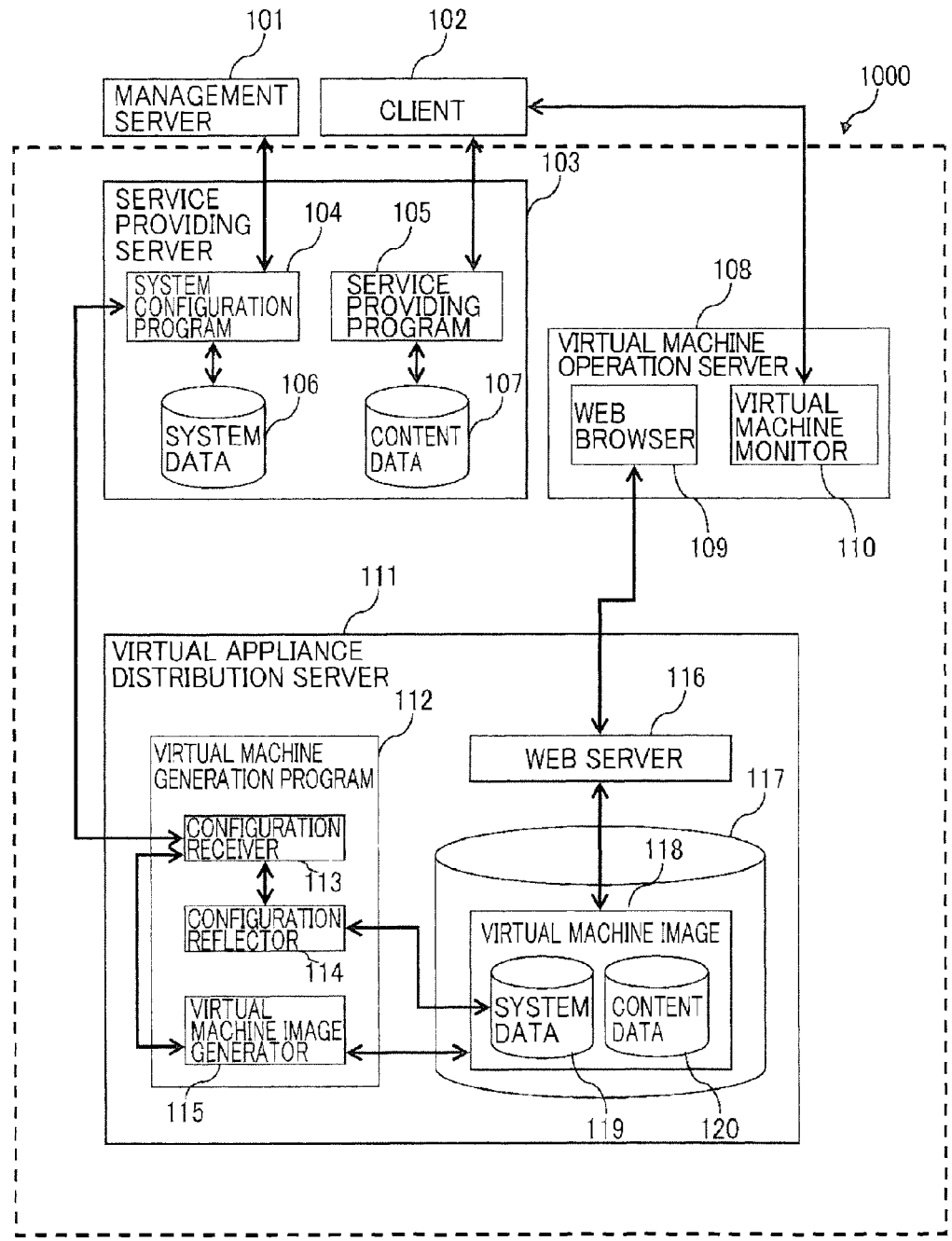
FIG. 1 is a diagram showing an entire configuration of an information processing system according to an embodiment.

FIG. 1 shows the entire configuration of an information processing system 1000 of a first embodiment of the present invention.

The information processing system 1000 according to the first embodiment is configured by communicatively coupling a service providing server (an information apparatus) 103, a virtual machine operation server (a virtual machine execution apparatus) 108, and a virtual appliance distribution server (a virtual machine image generation apparatus) 111.

The service providing server 103 is a computer providing information processing service that: receives a request for information processing service from a client 102, which is communicatively coupled to the service providing server 103; and performs information processing according to the request and transmits the result to the client 102.

The service providing server 103 is a computer that provides information processing service by transmitting content data 107 such as a web page or video data to the client 102, for example, according to a request transmitted from the client 102 via the Internet. The service providing server 103 provides the above-mentioned information processing service by executing a service providing program 105. The service providing server 103 executes the service providing program 105, receives a service request from the client 102, and transmits the content data 107 to the client 102.

Also, the service providing server 103 executes a system configuration program 104 to define or change the system configuration of the service providing server 103 by co-operating with a management server 101. For example, by using the management server 101, a system administrator can define or change the content of system data 106 which define system configuration of the service providing server 103 such as the IP address of the server or configuration of the user account. Further the service providing server 103 also stores various defining information in system data 106 for providing information processing service. For example, if the service providing server 103 is a web server, the service providing server 103 stores various system configurations for web services program in system data 106.

The service providing server 103 changes the content of the system data 106 according to a system configuration change request transmitted from the management server 101. In the system data 106, the OS (Operating System) and programs and the system configuration of the service providing server 103 such as IP address of the server is stored. The system configuration program 104 receives a system configuration change request transmitted from the management server 101 and updates the system data 106.

The client 102 is a computer that is provided with information processing service from the service providing server 103.

The virtual appliance distribution server 111 is a computer that generates a virtual machine image 118 of the service providing server 103 and stores the image.

The virtual appliance distribution server 111 generates the virtual machine image 118 based on the system data 106 and the hardware configuration information used when the service providing server 103 provides its information processing service under a normal condition by executing a virtual machine generation program 112. Although the detail is described later, a virtual machine image generator 115 in the virtual machine generation program 112 generates the virtual machine image 118 of the service providing server 103, and stores the image in a disk 117.

Further, system data 119 in the virtual machine image 118 is generated based on the system data 106 of the service providing server 103. Also, content data 120 in the virtual machine image 118 is generated based on the content data 107 of the service providing server 103.

The service providing server 103, when receiving a system configuration change request from the management server 101, changes the system configuration described in the system data 106 according to the content of the system configuration change request. Also, the service providing server 103 transmits the changed content to the virtual appliance distribution server 111. Then a configuration receiver 113 in the virtual appliance distribution server 111 transfers the changed content of the system configuration to a configuration reflector 114. Then the configuration reflector 114 updates the content of the virtual machine image 118 according to the changed content.

In a similar manner, when a hardware configuration of the service providing server 103 is changed, the service providing server 103 transmits the changed content to the virtual appliance distribution server 111, and then the configuration reflector 114 updates the content of the virtual machine image 118 according to the changed content.

In this manner, the virtual appliance distribution server 111 holds the virtual machine image 118 in the disk 117 to implement a virtual machine capable of providing information processing service similar to the one provided by the service providing server 103.

The virtual machine operation server 108 is a computer that has an environment in which a virtual machine can be implemented. By acquiring the virtual machine image 118 and emulating the service providing server 103, the virtual machine operation server 108 runs a virtual machine that provides the functions of the information processing service provided by the service providing server 103.

In this embodiment, the virtual machine operation server 108 transmits a transmission request for the virtual machine image 118 via a web browser 109 to the virtual appliance distribution server 111, and acquires the virtual machine image 118 from a web server 116 in the virtual appliance distribution server 111. The virtual machine operation server 108 then runs a virtual machine using a virtual machine monitor 110 based on the acquired virtual machine image 118. The virtual machine implemented by the acquired virtual machine image 118 provides the client 102 with information processing service similar to the one provided by the service providing server 103.

In FIG. 1, only one client 102 is provided with the information processing service from the service providing server 103; however, multiple clients 102 may be provided with the information processing service from the service providing server 103.

Also, in FIG. 1, the virtual appliance distribution server 111 generates and distributes only the virtual machine image 118 for one service providing server 103; however, if multiple service providing servers 103 are present, the virtual appliance distribution server 111 may generate, store, and distribute the virtual machine images 118 for those service providing servers 103. In this case, the virtual appliance distribution server 111 stores the virtual machine image 118 of each service providing server 103 by associating the virtual machine image 118 with the identification information of each service providing server 103. The virtual machine operation server 108 transmits via the web browser 109, a transmission request for the virtual machine image 118 to the virtual appliance distribution server 111 by designating the identification information of the service providing server 103 for which the virtual machine image 118 is to be acquired. The virtual machine operation server 108 then acquires the virtual machine image 118 stored with being associated with the identification information from the web server 116 in the virtual appliance distribution server 111.

<Hardware Configuration>

Figure 2:
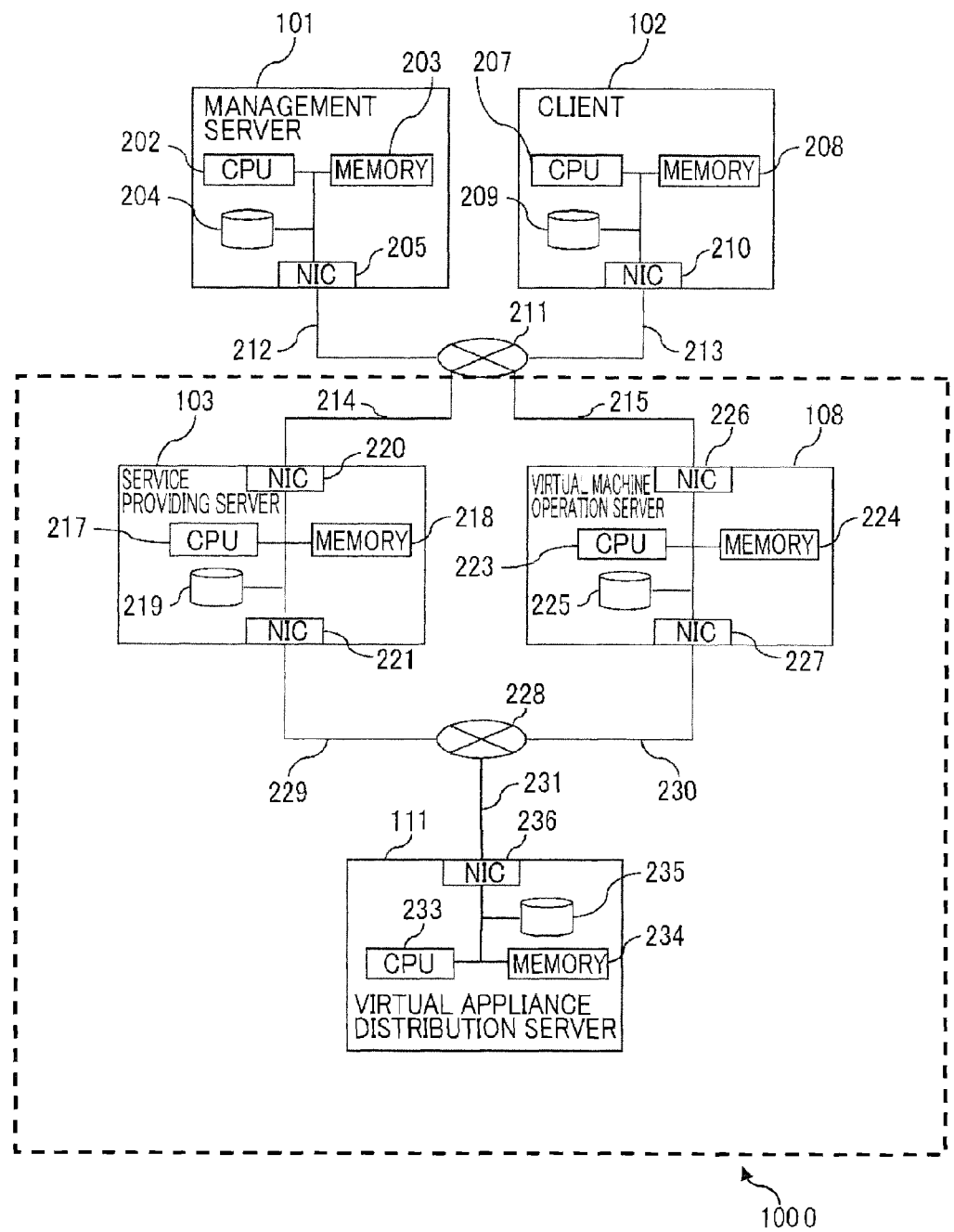
FIG. 2 is a diagram showing a hardware configuration of an information processing system according to the embodiment.

Next, the hardware configurations of the management server 101, the client 102, the service providing server 103, the virtual machine operation server 108, and the virtual appliance distribution server 111 of this embodiment are shown in FIG. 2.

—Management Server—

The management server 101 is configured by including a CPU (Central Processing Unit) 202, a memory 203, a storage device 204 and a NIC (Network Interface Card) 205.

The components are coupled to each other by an internal bus or an internal network. The number of CPUs, memory units, NICs, and storage devices is not limited to those shown in FIG. 2.

The CPU 202 executes the programs stored in the memory 203.

The memory 203 is, for example, a semiconductor memory, and is the main storage device that stores the programs executed by the CPU 202, and the data referenced by the programs.

The NIC 205 is used to allow the management server 101 to transmit and receive data to and from the service providing server 103 and the virtual machine operation server 108 via a LAN (Local Area Network) 211.

The storage device 204 is a secondary storage device to store the programs and files used by the management server 101. The management server 101 can use an SSD (Solid State Drive), an HDD (Hard Disk Drive), a tape device, or the like as the secondary storage device. In the example shown in FIG. 2, the storage device 204 is coupled to other components via the internal bus, however, the storage device 204 may be coupled to the other components via a storage controller such as a RAID (Redundant Array of Indexing Disk) controller. Also, the storage device 204 on a SAN (Storage Area Network) may be coupled to other components via an FC (Fiber Channel) and an HBA (Host Bus Adaptor).

—Client—

The client 102 includes a CPU 207, a memory 208, a storage device 209, and a NIC 210. The components are coupled to each other by an internal bus or an internal network. The number of CPUs, memory units, storage devices, and NICs is not limited to that shown in FIG. 2.

The CPU 207 executes the programs stored in the memory 208.

The memory 208 is, for example, a semiconductor memory, and is the main storage device that stores the programs executed by the CPU 207, and the data referenced by the programs.

The NIC 210 is used to allow the client 102 to transmit and receive data to and from the service providing server 103 and the virtual machine operation server 108, via the LAN 211.

The storage device 209 is a secondary storage device to store the programs and files used by the client 102. The client 102 can use an SSD, an HDD, a tape device, or the like as the secondary storage device. In the example shown in FIG. 2, the storage device 209 is coupled to other components via the internal bus, however, the storage device 209 may be coupled to other components via a storage controller such as a RAID controller. Also, the storage device 209 on a SAN (Storage Area Network) may be coupled to other components via an FC or an HBA.

—Service Providing Server—

The service providing server 103 includes a CPU 217, a memory 218, a storage device 219, an NIC 220, and an NIC 221. The components are coupled to each other by an internal bus or an internal network. The number of CPUs, memory units, storage devices, and NICs is not limited to that shown in FIG. 2.

The CPU 217 executes the programs stored in the memory 218.

The memory 218 is, for example, a semiconductor memory, and is the main storage device that stores the programs executed by the CPU 217, and the data referenced by the programs.

The NIC 220 is used to allow the service providing server 103 to transmit and receive data to and from the management server 101 and the client 102 via the LAN 211.

The NIC 221 is used to allow the service providing server 103 to transmit and receive data to and from the virtual appliance distribution server 111 via a WAN (Wide Area Network) 228.

The storage device 219 is a secondary storage device to store the programs and files used by the service providing server 103. The service providing server 103 can use an SSD, an HDD, a tape device, or the like as the secondary storage device. In the example shown in FIG. 2, the storage device 219 is coupled to other components via the internal bus, however, the storage device 219 may be coupled to the other components via a storage controller such as a RAID controller. Also, the storage device 219 on a SAN may be coupled to other components via an FC and an HBA.

—Virtual Machine Operation Server—

The virtual machine operation server 108 includes a CPU 223, a memory 224, a storage device 225, an NIC 226, and an NIC 227. The components are coupled to each other by an internal bus or an internal network. The number of CPUs, memory units, storage devices, and NICs is not limited to that shown in FIG. 2.

The CPU 223 executes the programs stored in the memory 224.

The memory 224 is, for example, a semiconductor memory, and is the main storage device that stores the programs executed by the CPU 223, and the data referenced by the programs.

The NIC 226 is used to allow the virtual machine operation server 108 to transmit and receive data to and from the management server 101 and the client 102 via the LAN 211.

The NIC 227 is used to allow the virtual machine operation server 108 to transmit and receive data to and from the virtual appliance distribution server 111 via the WAN 228.

The storage device 225 is a secondary storage device to store the programs and files used by virtual machine operation server 108. The virtual machine operation server 108 can use an SSD, an HDD, a tape device, or the like as the secondary storage device. In the example shown in FIG. 2, the storage device 225 is coupled to other components via the internal bus, however, the storage device 225 may be coupled to the other components via a storage controller such as a RAID controller. Also, the storage device 225 on a SAN may be coupled to other components via an FC and an HBA.

—Virtual Appliance Distribution Server—

The virtual appliance distribution server 111 includes a CPU 233, a memory 234, a storage device 235 and an NIC 236. The components are coupled to each other by an internal bus or an internal network. The number of CPUs, memory units, NICs, and storage devices is not limited to that shown in FIG. 2.

The CPU 233 executes the programs stored in the memory 234.

The memory 234 is, for example, a semiconductor memory, and is the main storage device that stores the programs executed by the CPU 233, and the data referenced by the programs.

The NIC 236 is used to allow the virtual appliance distribution server 111 to transmit and receive data to and from the service providing server 103 and the virtual machine operation server 108 via the WAN 228.

The storage device 235 is a secondary storage device to store the programs and files used by the virtual appliance distribution server 111. The virtual appliance distribution server 111 can use an SSD, an HDD, a tape device, or the like as the secondary storage device. In the example shown in FIG. 2, the storage device 235 is coupled to other components via the internal bus, however, the storage device 235 may be coupled to the other components via a storage controller such as a RAID controller. Also, the storage device 235 on a SAN may be coupled to other components via an FC and an HBA.

—Communication Channel—

For communication channels 212, 213, 214, 215, 229, 230, and 231, for example, Ethernet (registered trademark) may be used; however, media other than Ethernet may also be used as long as communication can be made by the media.

In FIG. 2, the management server 101, the client 102, the service providing server 103, and the virtual machine operation server 108 are connected via the LAN, but they may be connected via a WAN.

In FIG. 2, the service providing server 103, the virtual machine operation server 108, and the virtual appliance distribution server 111 are coupled via the WAN, however, they may be coupled via a LAN.

In FIG. 2, only one client 102 is coupled to the service providing server 103 via the LAN 211; however, multiple clients 102 may be coupled to the LAN 211 to communicate with the service providing server 103.

In FIG. 2, only one service providing server 103 is coupled to the virtual appliance distribution server 111 via the WAN 228; however, multiple service providing servers 103 may be coupled to the WAN 228 to communicate with the virtual appliance distribution server 111.

<Description of Operation>

—Service Providing Server—

The operation of the service providing server 103 according to this embodiment is described.

Figure 3:
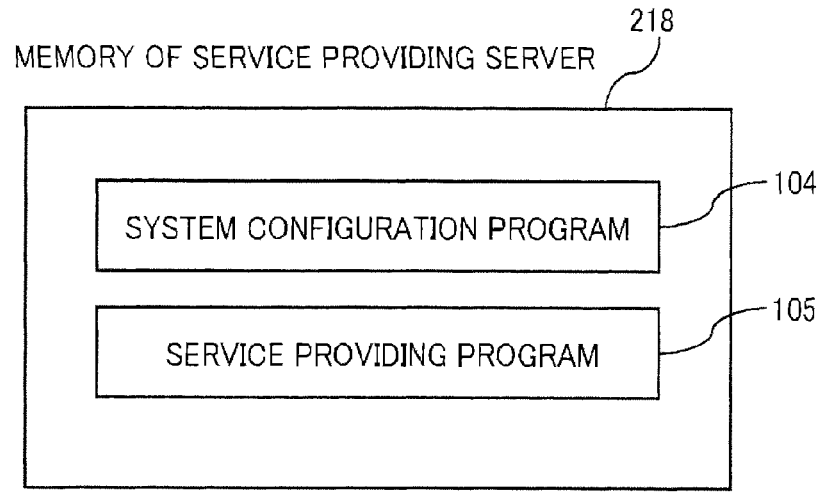
FIG. 3 is a diagram showing a software configuration of a service providing server according to the embodiment.

FIG. 3 shows the configuration of the programs stored in the memory 218 included in the service providing server 103.

The system configuration program 104 receives a system configuration request and/or a system configuration change request (such as change of an IP address, and/or addition/deletion of a user account) from the management server 101, and defines or changes the system configuration of the service providing server 103. The system configuration program 104, when receiving a system configuration request and/or a system configuration change request from the management server 101, configures or updates the system data 106 stored in the storage device 219 of the service providing server 103.

Also, the system configuration program 104 transfers the received system configuration request and/or system configuration change request to the configuration receiver 113 of the virtual machine generation program 112, which operates on the virtual appliance distribution server 111.

The service providing program 105 is a program that provides information processing service for the client 102. For example, a web server program may serve as the service providing program 105. The service providing program 105, for example, provides the client 102 with the content data 107 stored in the storage device 219 of the service providing server 103 in response to a request from the client 102.

—Virtual Appliance Distribution Server—

The operation of the virtual appliance distribution server 111 according to this embodiment is described.

Figure 4:
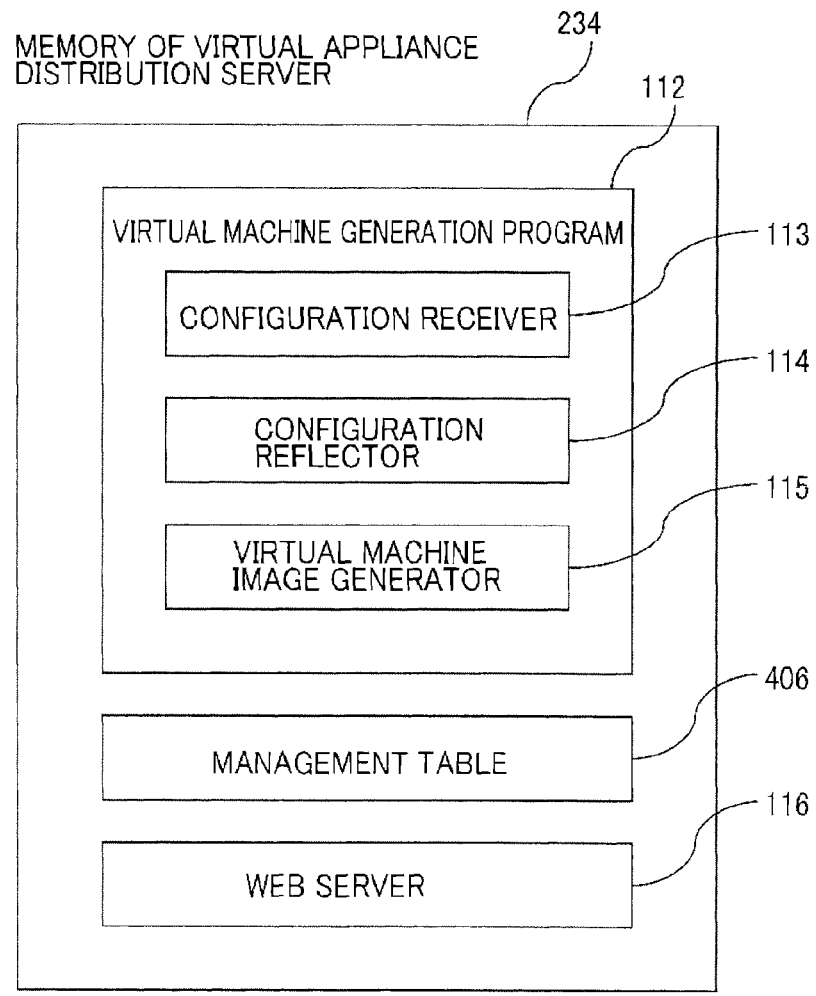
FIG. 4 is a diagram showing a software configuration of a virtual appliance distribution server according to the embodiment.

FIG. 4 exemplarily shows the configuration of the program stored in the memory 234 included in the virtual appliance distribution server 111, and the data referenced by the program.

The virtual machine generation program 112 is a program that generates the virtual machine image 118 of the service providing server 103.

The configuration receiver 113 of the virtual machine generation program 112 receives a system configuration change request for the service providing server 103 from the system configuration program 104 of the service providing server 103. The received system configuration change request is transferred to the configuration reflector 114.

Also, the configuration receiver 113, when receiving a system configuration change request for the first time from the system configuration program 104, requests the virtual machine image generator 115 to generate the virtual machine image 118 of the service providing server 103.

The virtual machine image generator 115, when receiving a request to generate the virtual machine image 118 from the configuration receiver 113, generates the virtual machine image 118 of the service providing server 103 based on a template for generating the virtual machine image 118 of the service providing server 103. The template for generating the virtual machine image 118 of the service providing server 103 is pre-stored in the storage device 235 of the virtual appliance distribution server 111.

Figure 5:
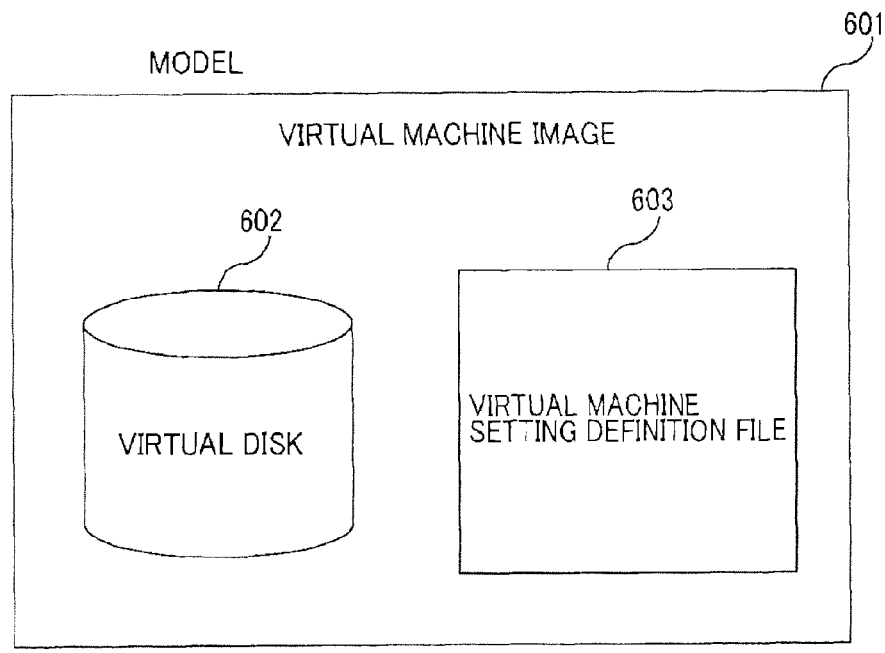
FIG. 5 is a diagram showing a template of a virtual machine image according to the embodiment.

An example of a template for the virtual machine image of the service providing server 216 is shown in FIG. 5. This template 601 includes a virtual disk 602 and a virtual machine setting definition file 603.

The virtual disk 602 stores data (the OS, system configuration data, programs, content data, and other data) similar to the one stored in the storage device 219 of the service providing server 103.

In the virtual machine setting definition file 603, the virtual hardware configuration information of the virtual machine image 118 of the service providing server 103 is described. In the initial state, virtual hardware information that has copied the hardware configuration information of the service providing server 103 is described.

Figure 6:
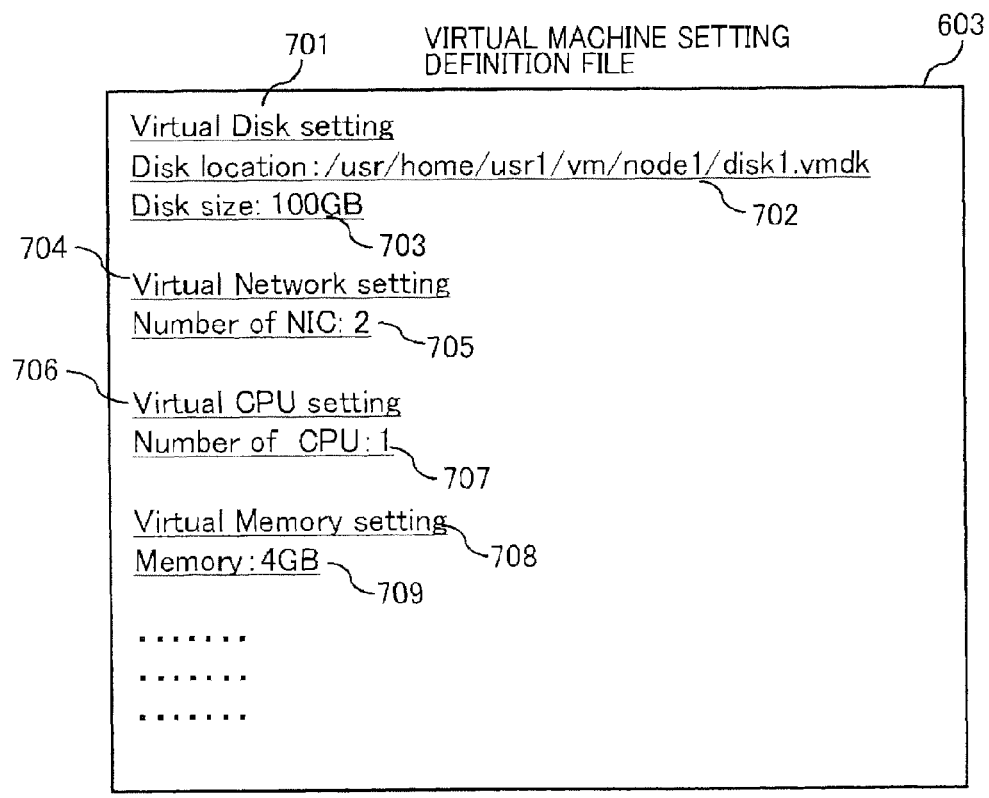
FIG. 6 is a diagram showing a virtual machine configuration definition file according to the embodiment.

An example of the virtual machine setting definition file 603 is shown in FIG. 6. A description 701, which is "Virtual Disk setting" indicates that the descriptions therebelow describe the setting of the virtual disk 602 provided to a virtual machine. A setting of the virtual disk 602 means a setting of the storage area allocated to the virtual machine to be implemented by the virtual machine operation server 108.

A description 702, which is "Disk location:/usr/home/usr1/vm/node1/disk1.vmdk" indicates the place where the virtual disk 602 is stored. A description 703, which is "Disk Size: 100 GB" indicates the size of the virtual disk 602. The size of the virtual disk 602 may have the same capacity as that of the storage device 219 included in the service providing server 103.

A description 704, which is "Virtual Network setting" indicates that the descriptions thereafter describe the setting of a virtual NIC. The setting of a virtual NIC means a setting of a NIC allocated to the virtual machine to be implemented by the virtual machine operation server 108.

A description 705, which is "Number of NIC: 2" indicates the number of virtual NICs assigned to the virtual machine to be implemented by the virtual machine operation server 108. The number of virtual NICs is required to be the same as that of virtual NICs included in the service providing server 103.

A description 706, which is "Virtual CPU setting" indicates that the descriptions thereafter describe the setting of a virtual CPU. A setting of a virtual CPU means a setting of a CPU allocated to the virtual machine to be implemented by the virtual machine operation server 108.

A description 707, which is "Number of CPU: 1" indicates the number of virtual CPUs assigned to the virtual machine to be implemented by the virtual machine operation server 108.

A description 708, which is "Virtual Memory setting" indicates that the descriptions thereafter describe the setting of a virtual memory. A setting of a virtual memory means a setting of a memory allocated to the virtual machine to be implemented by the virtual machine operation server 108.

A description 709, which is "Memory: 4GB" indicates the size of the memory assigned to the virtual machine to be implemented by the virtual machine operation server 108.

The virtual machine image generator 115 generates the virtual machine image 118 of the service providing server 103 by making a copy of the template 601 of the virtual machine image as described above. The virtual machine image generator 115, when copying the template 601, rewrites the content of the description 702, i.e., "Disk location:/usr/home/usr1/vm/node1/disk1.vmdk" of the virtual machine setting definition file 603 into the content showing the storage destination of the copy of the template 601.

The virtual appliance distribution server 111 transmits the generated virtual machine image 118 of the service providing server 103 to the virtual machine operation server 108 by using the web server 116. The virtual machine operation server 108 executes the acquired virtual machine image 118 using the virtual machine monitor 110. The execution of the virtual machine image 118 is described later.

In the case where the virtual appliance distribution server 111 stores the virtual machine images 118 of multiple service providing servers 103, the correspondences between the service providing servers 103 and the respective virtual machine images 118 need to be managed.

In order to achieve this management, the system configuration program 104 of the service providing server 103, when transmitting changed contents of the system configuration to the virtual appliance distribution server 111, includes the identifier uniquely assigned to each service providing server 103 in the contents and transmits them. This identifier is assumed to be recorded in advance in the system configuration data in the storage device 219 of the service providing server 103.

The configuration receiver 113 of the virtual appliance distribution server 111 transfers a system configuration change request including the identifier of the service providing server 103 to the virtual machine image generator 115.

The virtual machine image generator 115, when generating the virtual machine image 118 of the relevant service providing server 103, adds an entry for the relevant service providing server 103 to a management table 406, and stores the service providing servers 103 and the respective generated virtual machine images 118 by associating one with the other.

Figure 7:
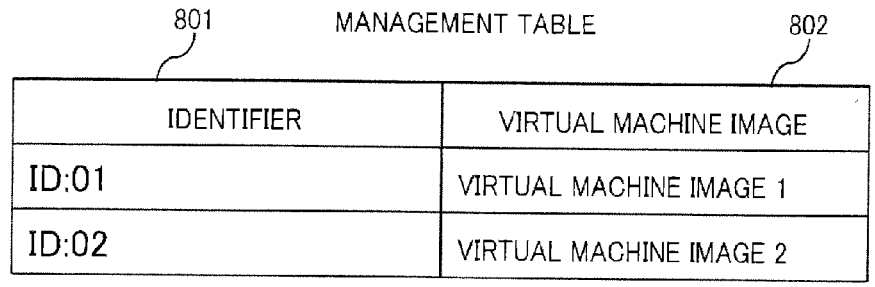
FIG. 7 is a diagram showing a management table according to the embodiment.

FIG. 7 shows how the identifier of the service providing server 103 with that of the virtual machine image 118 are associated and stored in the management table 406. An "identifier" column 801 stores the identifier of the service providing server 103. A "virtual machine image" column 802 stores the identifier of the associated virtual machine image 118 (for example, a name of virtual machine image).

Also, the virtual machine image generator 115, when generating the virtual machine image 118, rewrites the identifier of the service providing server recorded in the system configuration data in the virtual disk 602 of the template 601 into the received identifier.

Figure 8:
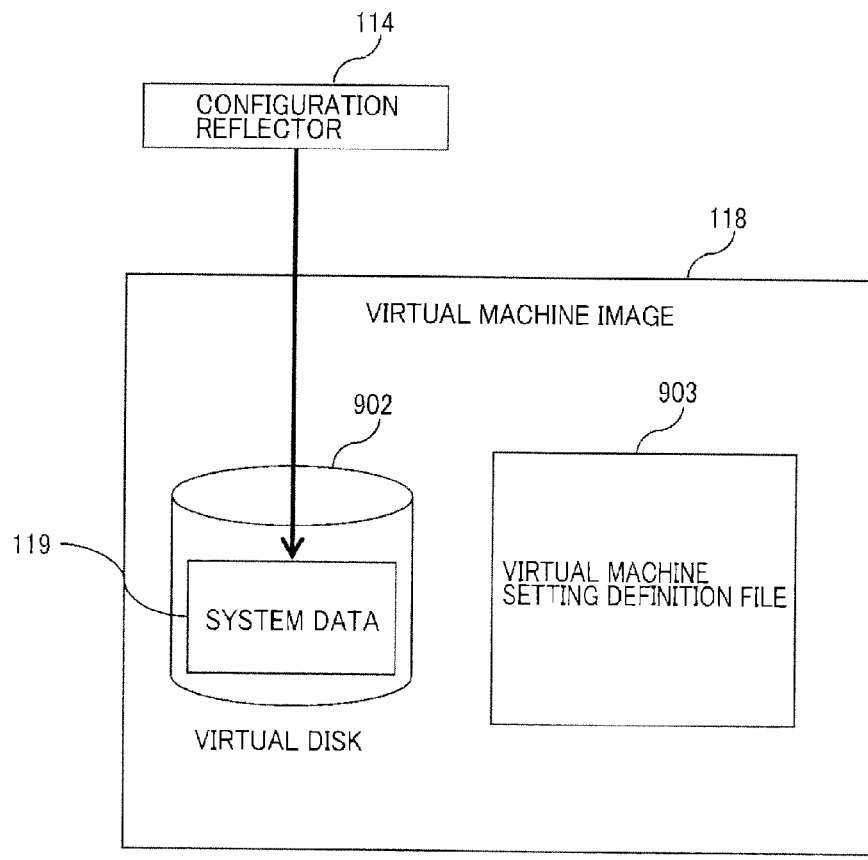
FIG. 8 is a diagram showing an outline of the virtual machine image according to the embodiment.

The configuration reflector 114 of the virtual appliance distribution server 111 updates the virtual machine image 118 of the service providing server 103 according to the content of the system configuration change request to the service providing server 103 transferred from the configuration receiver 113. The update is shown in FIG. 8.

The virtual machine image 118 is configured by including a virtual disk 902 and a virtual machine setting definition file 903. The virtual disk 902 is generated based on the virtual disk 602 of the template 601, and stores the data (the OS, system configuration data, programs, content data, and other data) similar to the one stored in the storage device 219 of the service providing server 103 as described above.

The configuration reflector 114 of the virtual appliance distribution server 111 updates the system data 119 in the virtual disk 902 according to the content of the system configuration change request of the service providing server 103 received from the configuration receiver 113. At this point, the configuration reflector 114 refers to the identifier of the service providing server 103 included in the system configuration change request, and the content of the management table 406, so as to update the system data 119 of the virtual machine image 118 associated with the service providing server 103 which has requested a system configuration change.

Methods for updating the system data 119 in the virtual disk 902 includes: a method where the virtual machine monitor which is the software to implement a virtual machine based on the virtual machine image is installed in the virtual appliance distribution server 111, a virtual machine is implemented by executing the virtual machine image 118, and the configuration reflector 114 requests a system configuration change to the system configuration program 104 executed on the virtual machine; and a method where the virtual disk 902 is mounted on the file system of the virtual appliance distribution server 111, and the configuration reflector section 114 updates the system data 119.

By the virtual machine operation server 108 running a virtual machine having the system data 119 similar to the system data of the service providing server 103, the client 102 can be provided with information processing service similar to the one provided by the service providing server 103.

Figure 9:
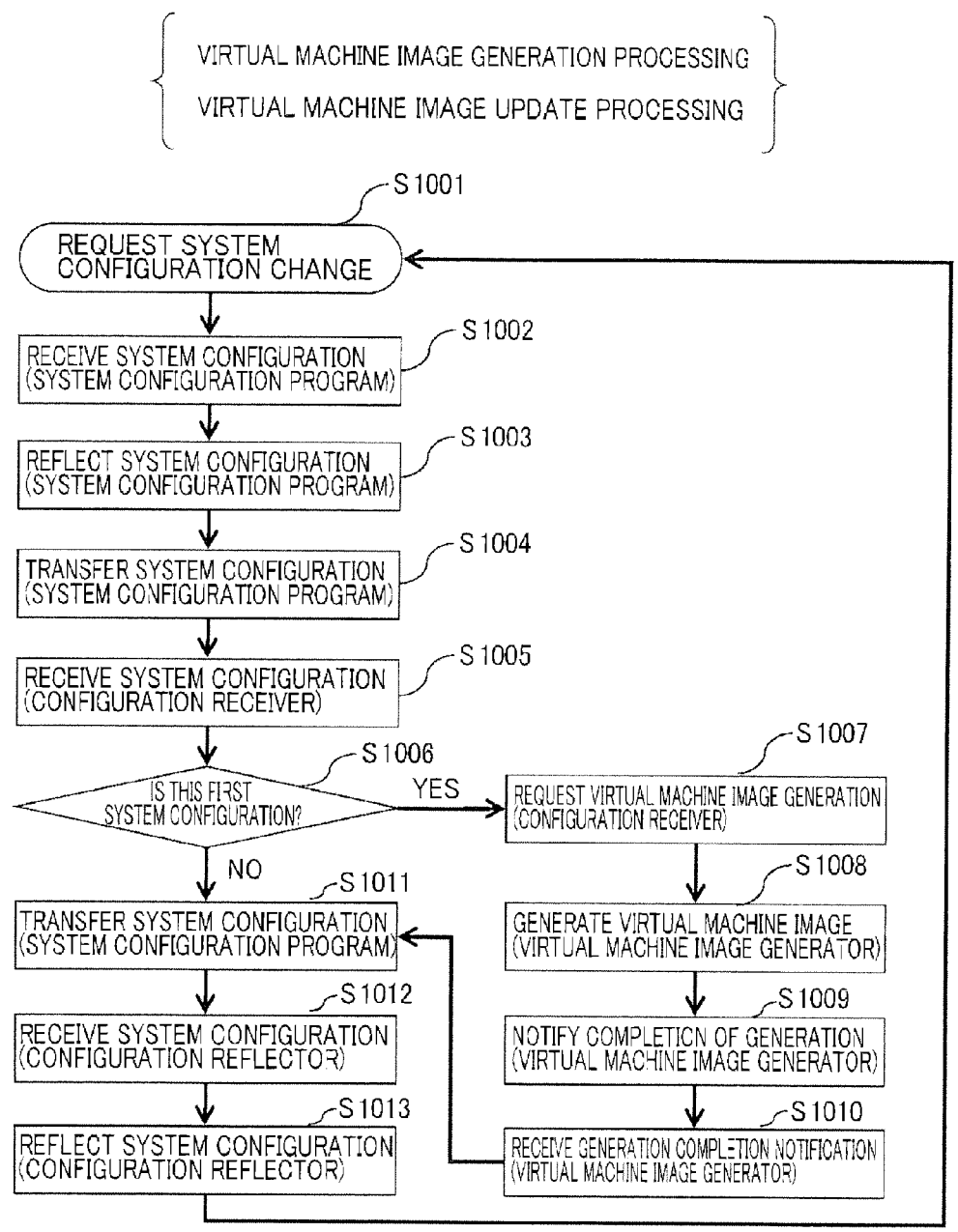
FIG. 9 is a flowchart for generation and update processing of the virtual machine image according to the embodiment.

Next, a flow of generation processing for the virtual machine image 118, and an update processing for the virtual machine image 118 is described with reference to the flowchart shown in FIG. 9.

First, the management server 101 receives a system configuration instruction from a system administrator, and changes the system configuration of the service providing server 103 (S1001). Next, the system configuration program 104 of the service providing server 103 receives a system configuration change request (S1002). The system configuration program 104 updates the system data 106 stored in the storage device 219 of the service providing server 103 according to the content of the system configuration change request (S1003). Next, the system configuration program 104 transfers the system configuration change request to the configuration receiver 113 of the virtual machine generation program 112 which operates on the virtual appliance distribution server 111 (S1004).

The configuration receiver 113 of the virtual appliance distribution server 111 receives the system configuration change request (S1005). The configuration receiver 113 determines whether the request is the first system configuration change request or not (S1006).

If the request is the first system configuration change request, the configuration receiver 113 requests the virtual machine image generator 115 to generate the virtual machine image 118 (S1007). The virtual machine image generator 115 which has received the request generates the virtual machine image 118 of the service providing server 103 by making a copy of the model 601 (S1008). Then, the virtual machine image generator 115, after generating the virtual machine image 118, notifies the configuration receiver 113 of the completion of the virtual machine image generation (S1009). The configuration receiver 113 receives a notification that the generation has been completed (S1010).

The configuration receiver 113 then transfers a system configuration change request to the configuration reflector 114 in order to update the difference between the above-mentioned generated virtual machine image 118 and the template 601 (S1011). The configuration reflector 114 receives the system configuration change request (S1012). The configuration reflector 114 then updates the virtual machine image 118 as described above (S1013).

On the other hand, in S1006, if the request is not the first system configuration change request, the configuration receiver 113 transfers the system configuration change request to the configuration reflector 114 in order to reflect the requested change to the generated virtual machine image 118 (S1011). The configuration reflector 114 receives the system configuration change request (S1012). The configuration reflector 114 updates the virtual machine image 118 as described above (S1013).

The above processing is carried out every time the administrator changes the system configuration of the service providing server 103 by using the management server 101.

—Virtual Machine Operation Server—

The operation of the virtual machine operation server 108 according to this embodiment is described.

Figure 10:
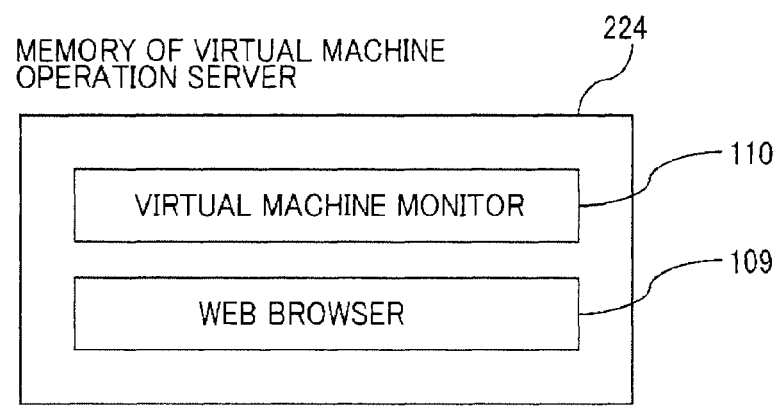
FIG. 10 is a diagram showing a software configuration of a virtual machine operation server according to the embodiment.

FIG. 10 shows the configuration of the programs stored in the memory 224 of the virtual machine operation server 108.

The web browser 109 is a program that is used for acquiring the virtual machine image 118 from the virtual appliance distribution server 111.

The virtual machine monitor 110 is a program that is used when the service providing server 103 is implemented as a virtual machine by emulating the service providing server 103 according to the virtual machine image 118 acquired from the virtual appliance distribution server 111.

A flow of recovery processing made by the service providing server 103 for the information processing service based on the virtual machine image 118 is described, the recovery processing being achieved by the virtual machine operation server 108 executing the virtual machine image 118.

First, if a hardware failure occurs in the service providing server 103, a system administrator logs into the virtual machine operation server 108 from the management server 101. Then, using the web browser 109, the system administrator transmits a transmission request of the virtual machine image 118, which designates the identifier of the service providing server 103 in which a hardware failure has occurred, to the virtual appliance distribution server 111. In response to the above-mentioned transmission request, the virtual appliance distribution server 111 searches for the virtual machine image 118 of the designated service providing server 103, and transmits the virtual machine image 118 to the virtual machine operation server 108.

By designating an identifier uniquely assigned to the service providing server 103 from a page on the web browser 109, the system administrator can download the virtual machine image 118 associated with the service providing server 103 identified by the above-mentioned identifier out of the virtual machine images 118 stored by the virtual appliance distribution server 111.

Figure 11:
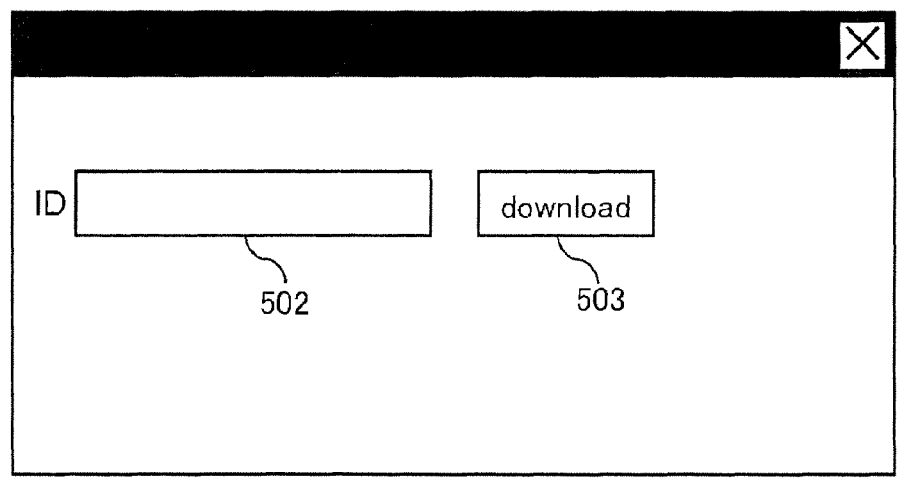
FIG. 11 is a diagram showing a download page for the virtual machine image according to the embodiment.

The web server 116 transmits a web page to the virtual machine operation server 108, the web page being used for the system administrator to instruct a transmission request for the above-mentioned virtual machine image 118. Then, the web browser 109 of the virtual machine operation server 108 displays a web page as shown in FIG. 11 (download page) on an output device such as a monitor of the virtual machine operation server 108.

When the identifier of the service providing server is inputted to an input field 502 of the downloaded page, and a download button 503 is clicked with a mouse and the like, the virtual machine operation server 108 transmits a transmission request of the virtual machine image 118 to the web server 116 along with the identifier.

The web server 116 refers to the management table 406, and transmits, to the web browser 109, the virtual machine image 118 associated with the service providing server 103 identified by the received identifier.

In this manner, the virtual machine operation server 108 downloads the virtual machine image 118 via the web browser 109. The virtual machine operation server 108 then stores the virtual machine image 118 in the storage device 225.

The virtual machine operation server 108, when receiving the virtual machine image 118, runs a virtual machine based on the virtual machine image 118. Specifically, the virtual machine operation server 108 activates the virtual machine monitor 110 so that the virtual machine monitor 110 emulates the service providing server 103 according to the virtual machine image 118. Thereby, the virtual machine reproducing the function of the information processing service by the service providing server 103 is implemented. By the virtual machine monitor 110 executing the virtual machine image 118, the service which has been provided by the service providing server 103 can be recovered.

Figure 12:
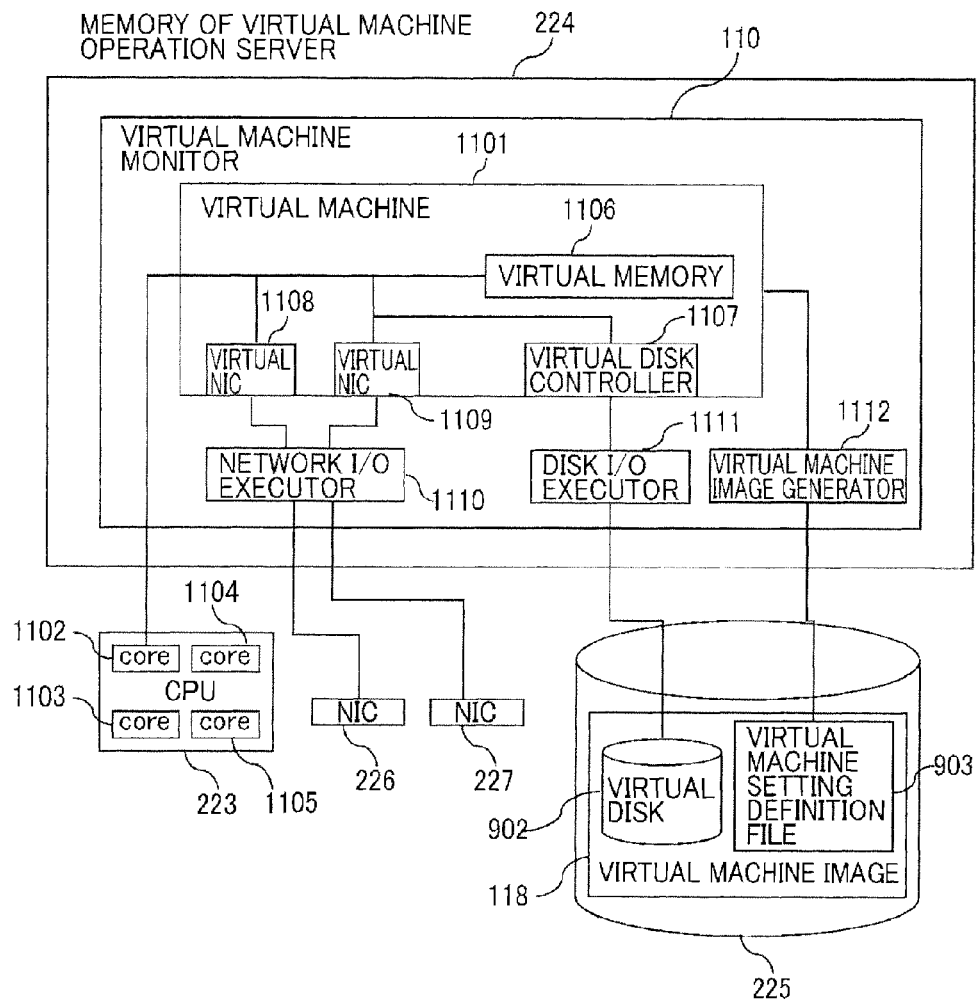
FIG. 12 is a diagram showing a virtual machine according to the embodiment.

FIG. 12 shows a configuration of a virtual machine 1101 implemented when the virtual machine monitor 110 executes the virtual machine image 118, and a relationship between the virtual machine 1101 and the hardware included in the virtual machine operation server 108.

When the virtual machine image 118 is executed, a virtual machine image generator 1112 in the virtual machine monitor 110 first reserves a virtual memory area for the virtual machine in a memory 224 of the virtual machine operation server 108, the area being used for the virtual memory 1106 where the OS, programs in the virtual disk 902, and the data referenced by the programs are stored. At this point, the size of the virtual memory 1106 is determined based on the content of the virtual machine setting definition file 903.

Next, the virtual machine image generator 1112 allocates a core from a CPU 223 to the virtual machine 1101. The OS and programs on the virtual memory 1106 are executed in the core. The core is the component which has a function to perform processing in the CPU. The number of cores to be allocated is determined based on the content of virtual machine setting definition file 903. In FIG. 12, a core 1102 is allocated to the virtual machine 1101.

Next, the virtual machine image generator 1112 allocates a virtual NIC. The virtual NIC is used for allowing the OS and programs on the virtual memory 1106 to communicate with an external computer. The number of virtual NICs to be allocated is determined based on the content of virtual machine setting definition file 903. In FIG. 12, a virtual NIC 1108 and a virtual NIC 1109 are allocated to the virtual machine 1101.

The data sent from the OS and programs to each of the virtual NICs 1108 and 1109 is transferred to a network I/O executor 1110 in the virtual machine monitor 110. The network I/O executor 1110 refers to the destination of the sent data to transfer the data to an appropriate NIC (physical hardware).

Data sent from an external computer to the virtual machine 1101 is transferred to the network I/O executor 1110 via a NIC (physical hardware). The network I/O executor 1110 refers to the destination of the data to transfer the data to an appropriate virtual NIC.

Next, the virtual machine image generator 1112 allocates a virtual disk controller 1107 which allows the OS and programs on the virtual memory 1106 to read and write data from and to the virtual disk 902. The OS and programs on the virtual memory 1106 read and write data from and to the virtual disk 902 via the virtual disk controller 1107. The virtual disk controller 1107 transfers a data read/write request from the OS and programs to the disk I/O executor 1111 in the virtual machine monitor 110. The disk I/O executor transfers the execution result of the data read/write request to the virtual disk 902 to the virtual disk controller 1107.

Figure 13:
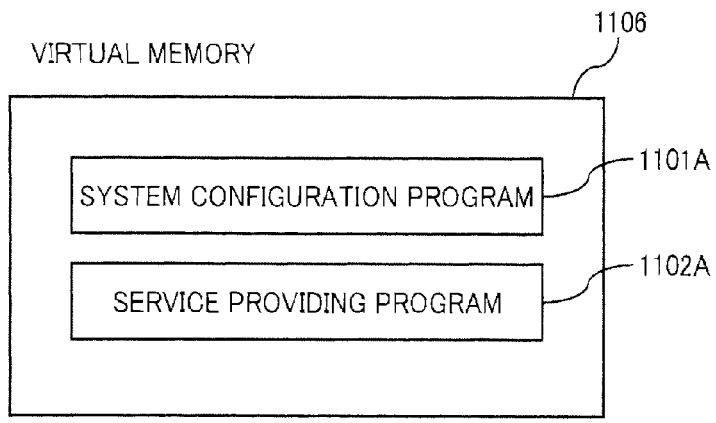
FIG. 13 is a diagram showing a configuration of a program operating on a virtual memory according to an embodiment.

FIG. 13 shows the configuration of the programs and the data referenced thereby stored on the virtual memory 1106.

A system configuration program 1101A operates similarly to the system configuration program 104.

A service providing program 1102A operates similarly to the service providing program 105, and provides the client 102 with a service similar to the one provided by the service providing server 103.

In this embodiment, the virtual machine image 118 of the service providing server 103 which provides information processing service is stored in the virtual appliance distribution server 111, and if a failure occurs in the information processing service, the virtual machine 1101 which provides the function of the information processing service is implemented based on the virtual machine image 118. Thereby, information processing service, in which a failure has occurred, can be immediately recovered without clustering the service providing servers 103 that provide the information processing service. Accordingly, a time period, in which users are unable to access the information processing service, can be reduced.

Also, in the case where the system or hardware configuration of the service providing server 103 is changed, the service providing server 103 transmits the content of the change to the virtual appliance distribution server 111, which updates the virtual machine image 118 according to the content of the change. Thereby, if a failure occurs in the service providing server 103, the virtual machine 1101 reproducing the service providing server 103 in the latest state immediately before the failure can be implemented. Accordingly, the client 102 can access to the provided service similar to the information processing service before the failure even after the occurrence of the failure of the service providing server 103.

Also, a transmission of the virtual machine image 118 from the virtual appliance distribution server 111 to the virtual machine operation server 108 is made according to a request from the web browser 109 of the virtual machine operation server 108 so that if a failure occurs in the service providing server 103, the information processing service to the client 102 can be stopped, for example, at the discretion of the system administrator.

Alternatively, if a failure occurs in the service providing server 103, at the discretion of the system administrator, the virtual machine image 118 of the service providing server 103, which can provide a different service from the information processing service provided by the service providing server 103 involved in a failure (for example, the service is provided while informing the users that the system is in a special operation due to a failure occurrence), is downloaded to the virtual machine operation server 108 to implement the virtual machine 1101 so that the information processing service can be provided for the client 102.

==Second Embodiment==
<Entire Configuration>

A second embodiment is described below.

Figure 14:
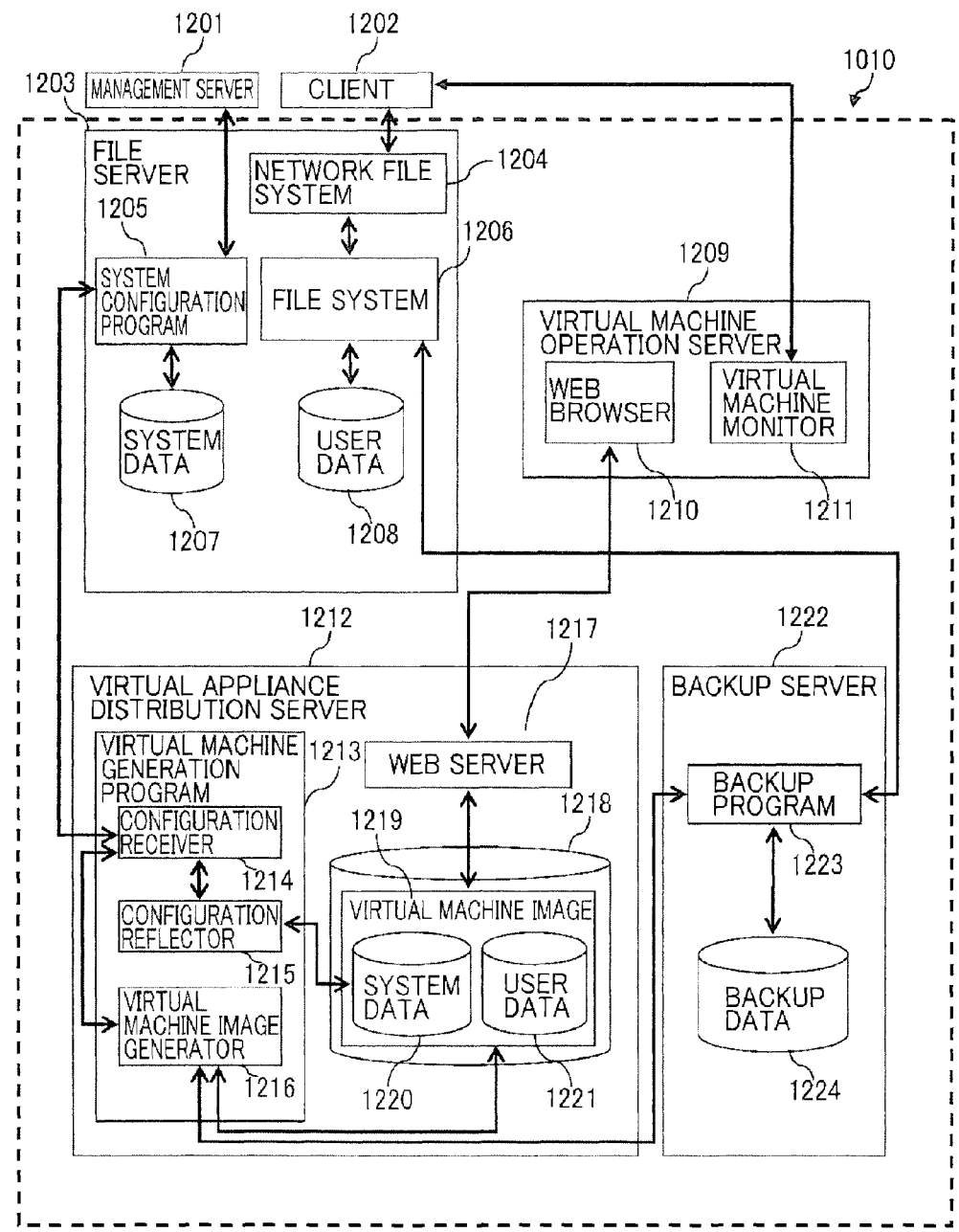
FIG. 14 is a diagram showing an outline of an information processing system according to another embodiment.

FIG. 14 shows the entire configuration of an information processing system 1010 of the second embodiment.

The second embodiment assumes the case where a file server 1203 provides file service for a client 1202.

A management server 1201 cooperates with a system configuration program 1205 which operates in the file server (information processing device) 1203 to define or change the system configuration thereof. By using the management server 1201, the system administrator can define or change the system configuration of the file server 1201 such as an IP address or any other configurations for providing file service to the client 1202.

The client (service access device) 1202 is a computer that receives file service from the file server 1203 via a network file system 1204. The client 1202 can request a file operation (such as file read/write or file creation/deletion also referred to as a data input/output request) to a file system 1206 constructed on a storage device of the file server 1203 via the network file system 1204.

The file server 1203 is a computer such as a file server device that provides file service for the client 1202. The network file system 1204 receives a file operation from the client 1202, and transfers the file operation to the file system 1206. The file system 1206 executes the requested file operation on user data 1208 (files stored on the storage device, and used by clients) on the storage device, and returns the execution result to the network file system 1204. The network file system 1204, when receiving the execution result, transmits the execution result to the client 1202.

Also, the file server 1203 changes its own system configuration according to a system configuration change request from the management server 1201. The OS, programs, and system configuration data of the file server 1203 are stored in system data 1207. The system configuration program 1205 receives a system configuration change request from the management server 1201, and updates the system configuration data in the system data 1207 according to the received system configuration change request.

Also, the file server 1203 has a function to cooperate with a backup server 1222 to back up the user data 1208 to a storage device on the backup server 1222.

When the remaining capacity of the storage device of the file server 1203 falls below a predetermined threshold value (or a predetermined threshold ratio), the file system 1206 extracts those files that have not been used for a predetermined time period from the user data 1208, and transfers the files to the storage device of the backup server 1222 and stores the files in backup data 1224 via a backup program 1223. The file system 1206 converts the files backed up to the backup server 1222 into special files called stub files. The stub file consists of metadata which records file attributes such as access permissions, file size and any other information and the location information indicating where the file is stored on the backup server 1222 (the data portion which is the file entity is deleted).

When the client 1202 makes a write request to a stub file, the file system 1206 refers to the backup file location information recorded in the stub file to acquire the data of the file corresponding to the relevant stub file from the backup data 1224 via the backup program 1223. The file system 1206 then converts the stub file into a normal file by deleting the location information from the stub file, and adding the acquired file data thereto instead. The file system 1206 then executes write request to the converted file.

When the client 1202 makes a read request for a stub file, the file system 1206 acquires the file data via the backup program 1223 to transfer the file data to the client 1202 via the network file system 1204. At this point, the stub file may not be converted to a normal file.

A virtual appliance distribution server (virtual machine image generation apparatus) 1212 is a computer such as a server device that generates and distributes a virtual machine image to implement a virtual machine which can provide file service similar to the one provided by the file server 1203.

A virtual machine image generator 1216 in a virtual machine generation program 1213 generates a virtual machine image 1219 of the file server 1203, in a disk 1218. Data similar to the system data 1207 of the file server 1203 is stored in system data 1220 in the virtual machine image 1219. User data 1221 in the virtual machine image 1219 may be empty data without storing any file.

The system configuration program 1205, when receiving a system configuration change request from the management server 1201, changes the system configuration of the file server 1203 as described above, while transmitting the changed content of the system configuration to a configuration receiver 1214 in the virtual machine generation program 1213. The configuration receiver 1214 which has received the changed content of the system configuration, transfers it to a configuration reflector 1215 in the virtual machine generation program 1213. The configuration reflector 1215 which has received the changed content of the system configuration updates the system configuration data in the system data 1220 according to the changed content of the system configuration. In this manner, in the disk 1218, the virtual appliance distribution server 1212 holds the virtual machine image 1219 which can provide file service similar to the one provided by the file server 1203.

A virtual machine operation server 1209 is a computer such as a server device that executes the virtual machine image 1219 held by the virtual appliance distribution server 1212. The virtual machine operation server 1209 acquires the virtual machine image 1219 from a web server 1217 in the virtual appliance distribution server 1212 via a web browser 1210, and executes the virtual machine image 1219 using a virtual machine monitor 1211. By the file server 1203 restoring backed up file from the backup data 1224 of the backup server 1222 to the user data 1221, the executed virtual machine image 1219 can provide file service similar to the one provided by the file server 1203 for the client 1202.

In FIG. 14, the client which receives provision of file service from the file server 1203 is only the client 1202; however, multiple clients may be provided with file service from the file server 1203.

In FIG. 14, the virtual machine image generated and distributed by the virtual appliance distribution server 1223 is only the virtual machine image 1219 of the file server 1203; however, virtual machine images of multiple file servers may be generated and distributed.

<Hardware Configuration>

Figure 15:
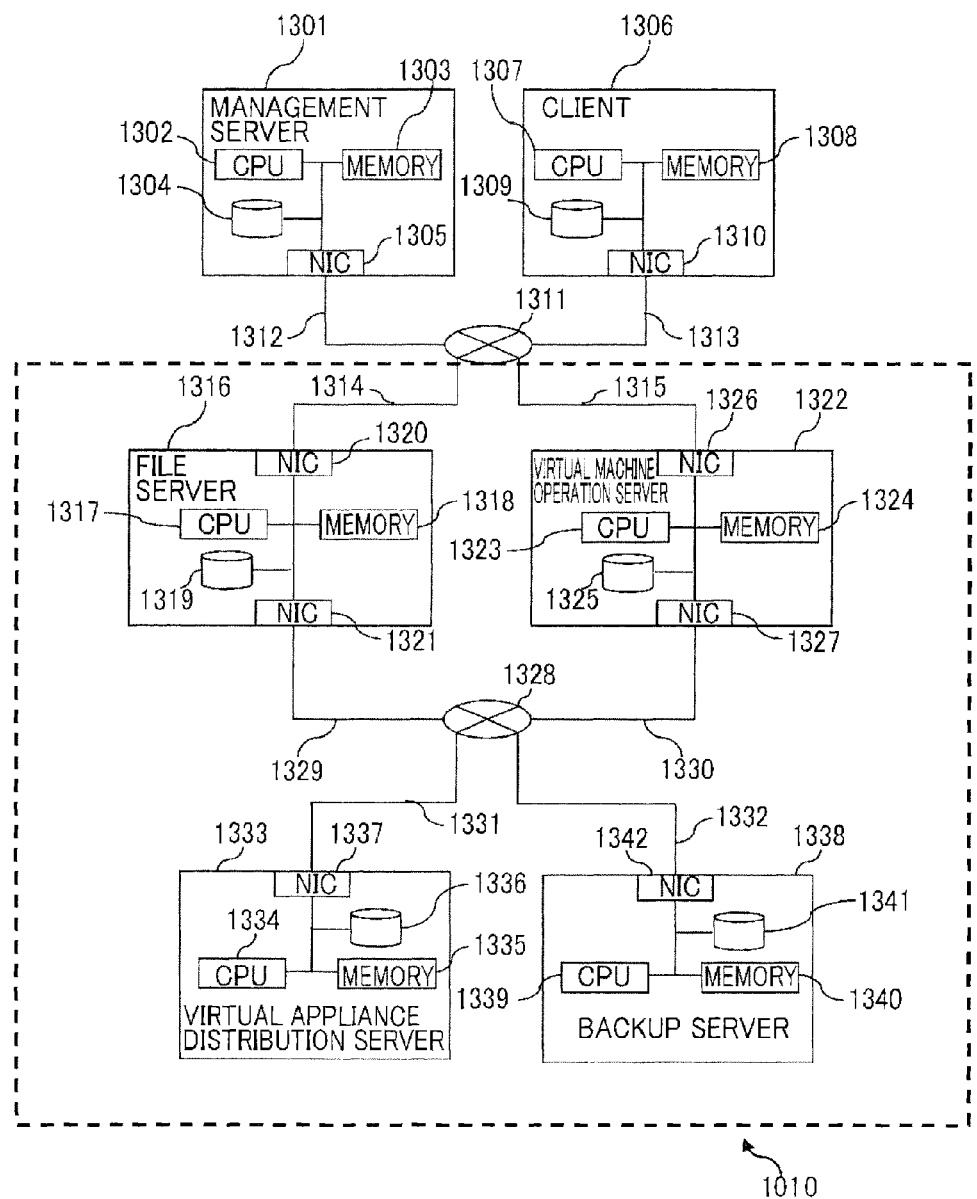
FIG. 15 is a diagram showing a hardware configuration of the information processing system according to the embodiment

FIG. 15 shows the hardware configuration diagram of the entire system in a second embodiment.

—Management Server—

The management server 1301 is configured by including a CPU (Central Processing Unit) 1302, a memory 1303, a storage device 1304 and a NIC (Network Interface Card) 1305.

The components are coupled to each other by an internal bus or an internal network. The number of CPUs, memory units, NICs, and storage devices is not limited to the one shown in FIG. 15.

The CPU 1302 executes the programs stored in the memory 1303.

The memory 1303 is, for example, a semiconductor memory, and is the main storage device that stores the programs executed by the CPU 1302, and the data referenced by the programs.

The NIC 1305 is used to allow the management server 1301 to transmit and receive data to and from the file server 1316 and the virtual machine operation server 1322 via a LAN 1311.

The storage device 1304 is a secondary storage device to store the programs and files used by the management server 1301. The management server 1301 can use an SSD, an HDD, a tape device, or the like as the secondary storage device. In the example shown in FIG. 15, the storage device 1304 is coupled to other components via the internal bus, however, the storage device 1304 may be coupled to the other components via a storage controller such as a RAID controller. Also, the storage device 1304 on a SAN may be coupled to other components via an FC and an HBA.

—Client—

The client 1306 includes a CPU 1307, a memory 1308, a storage device 1309, and an NIC 1310. The components are coupled to each other by an internal bus or an internal network. The number of CPUs, memory units, storage devices, and NICs is not limited to the one shown in FIG. 15.

The CPU 1307 executes the programs stored in the memory 1308.

The memory 1308 is, for example, a semiconductor memory, and is the main storage device that stores the programs executed by the CPU 1307, and the data referenced by the programs.

The NIC 1310 is used to allow the client 1306 to transmit and receive data to and from the file server 1316 and the virtual machine operation server 1322, via the LAN 1311.

The storage device 1309 is a secondary storage device to store the programs and files used by the client 1306. The client 1306 can use an SSD, an HDD, a tape device, or the like as the secondary storage device. In the example shown in FIG. 15, the storage device 1309 is coupled to other components via the internal bus, however, the storage device 1309 may be coupled to other components via a storage controller such as a RAID controller. Also, the storage device 1309 on a SAN (Storage Area Network) may be coupled to other components via an FC and an HBA.

—File Server—

The file server 1316 includes a CPU 1317, a memory 1318, a storage device 1319, an NIC 1320, and an NIC 1321. The components are coupled to each other by an internal bus or an internal network. The number of CPUs, memory units, storage devices, and NICs is not limited to the one shown in FIG. 15.

The CPU 1317 executes the programs stored in the memory 1318.

The memory 1318 is, for example, a semiconductor memory, and is the main storage device that stores the programs executed by the CPU 1317, and the data referenced by the programs.

The NIC 1320 is used to allow the file server 1316 to transmit and receive data to and from the management server 1301 and the client 1306 via the LAN 1311.

The NIC 1321 is used to allow the file server 1316 to transmit and receive data to and from the virtual appliance distribution server 1333 and the backup server 1338 via a WAN 1328.

The storage device 1319 is a secondary storage device to store the programs and files used by the file server 1316. The file server 1316 can use an SSD, an HDD, a tape device, or the like as the secondary storage device. In the example shown in FIG. 15, the storage device 1319 is coupled to other components via the internal bus, however, the storage device 1319 may be coupled to the other components via a storage controller such as a RAID controller. Also, the storage device 1319 on a SAN may be coupled to other components via an FC and an HBA.

The storage device 1319 has a first storage area and a second storage area, and in the first storage area, user data (target data to be read or written) 1208 is recorded.

Also, in the second storage area, the system data 1207 and hardware configuration information of the file server 1316 are stored. Also, the first storage area and the second storage area may be formed in the same housing of the storage device 1319, or may be formed in different housings. Also, as a configuration, the storage device 1319 may be attached internally to the server 1316, or may be attached externally thereto.

—Virtual Machine Operation Server—

The virtual machine operation server 1322 includes a CPU 1323, a memory 1324, a storage device 1325, an NIC 1326, and an NIC 1327. The components are coupled to each other by an internal bus or an internal network. The number of CPUs, memory units, storage devices, and NICs is not limited to the one shown in FIG. 15.

The CPU 1323 executes the programs stored in the memory 1324.

The memory 1324 is, for example, a semiconductor memory, and is the main storage device that stores the programs executed by the CPU 1323, and the data referenced by the programs.

The NIC 1326 is used to allow the virtual machine operation server 1322 to transmit and receive data to and from the management server 1301 and the client 1306 via the LAN 1311.

The NIC 1327 is used to allow the virtual machine operation server 1322 to transmit and receive data to and from the virtual appliance distribution server 1332 and the backup server 1338 via the WAN 1328.

The storage device 1325 is a secondary storage device to store the programs and files used by virtual machine operation server 1322. The virtual machine operation server 1322 can use an SSD, an HDD, a tape device, or the like as the secondary storage device. In the example shown in FIG. 15, the storage device 1325 is coupled to other components via the internal bus, however, the storage device 1325 may be coupled to the other components via a storage controller such as a RAID controller. Also, the storage device 1325 on a SAN may be coupled to other components via an FC and an HBA.

—Virtual Appliance Distribution Server—

The virtual appliance distribution server 1333 includes a CPU 1334, a memory 1335, a storage device 1336 and a NIC 1337. The components are coupled to each other by an internal bus or an internal network. The number of CPUs, memory units, NICs, and storage devices is not limited to the one shown in FIG. 15.

The CPU 1334 executes the programs stored in the memory 1335.

The memory 1335 is, for example, a semiconductor memory, and is the main storage device that stores the programs executed by the CPU 1334, and the data referenced by the programs.

The NIC 1337 is used to allow the virtual appliance distribution server 1332 to transmit and receive data to and from the file server 1316 and the virtual machine operation server 1322 via the WAN 1328.

The storage device 1336 is a secondary storage device to store the programs and files used by the virtual appliance distribution server 1333. The virtual appliance distribution server 1333 can use an SSD, an HDD, a tape device, or the like as the secondary storage device. In the example shown in FIG. 15, the storage device 1336 is coupled to other components via the internal bus, however, the storage device 1336 may be coupled to the other components via a storage controller such as a RAID controller. Also, the storage device 1336 on a SAN may be coupled to other components via an FC and an HBA.

—Backup Server—

The backup server 1338 is includes a CPU (Central Processing Unit) 1339, a memory 1340, a storage device 1341 and a NIC 1342. The components are coupled to each other by an internal bus or an internal network. The number of CPUs, memory units, NICs, and storage devices is not limited to the one shown in FIG. 15.

The CPU 1339 executes the programs stored in the memory 1340.

The memory 1340 is, for example, a semiconductor memory, and is the main storage device that stores the programs executed by the CPU 1339, and the data referenced by the programs.

The NIC 1342 is used to allow the backup server 1338 to transmit and receive data to and from the file server 1316 and the virtual machine operation server 1322 via the WAN 1328.

The storage device 1341 is a secondary storage device to store the programs and files used by the backup server 1338. The backup server 1338 can use an SSD (Solid State Drive), an HDD (Hard Disk Drive), a tape device, or the like as the secondary storage device. In the example shown in FIG. 15, the storage device 1341 is coupled to other components via the internal bus, however, the storage device 1341 may be coupled to the other components via a storage controller such as a RAID controller. Also, the storage device 1341 on a SAN may be coupled to other components via an FC and an HBA.

In the storage device 1341, a replica of the user data 1208 of the file server 1316 is recorded.

—Communication Channel—

For communication channels 1312, 1313, 1314, 1315, 1329, 1330, 1331, and 1332 for example, Ethernet (registered trademark) may be used; however, media other than Ethernet may also be used as long as communication can be made by the media.

In FIG. 15, the management server 1301, the client 1306, the file server 1316 and the virtual machine operation server 1322 are coupled via the LAN, however, may be coupled via a WAN.

In FIG. 15, the file server 1316, the virtual machine operation server 1322, the virtual appliance distribution server 1333, and the backup server 1338 are coupled via the WAN 1328, however, may be coupled via a LAN.

In FIG. 15, only one client 1306 is coupled to the file server 1316 via the LAN 1311; however, multiple clients may be coupled to the LAN 1311 to communicate with the file server 1316.

In FIG. 15, only one file server 1316 is coupled to the virtual appliance distribution server 1333 via the WAN 1328; however, multiple file servers 1316 may be coupled to the WAN 1328 to communicate with the virtual appliance distribution server 1333.

<Description of Operation>

—File Server—

Figure 16:
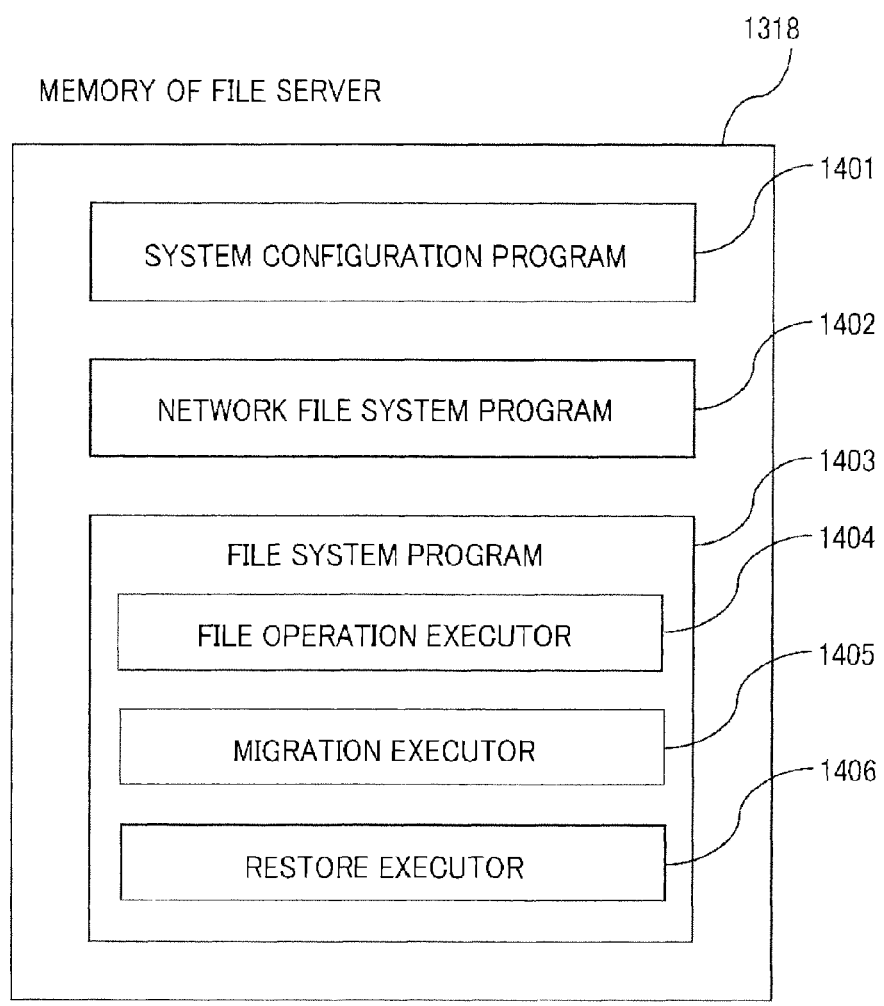
FIG. 16 is a diagram showing a software configuration of a file server according to the embodiment.

FIG. 16 shows the configuration of the programs stored in the memory 1318 included in the file server 1316.

A system configuration program 1401 operates similarly to the system configuration program 104 in the first embodiment.

A network file system program 1402 receives a file operation to be executed on a file on the storage device 1319 from the client 1306, and transfers the file operation to a file operation executor 1404 of a file system program 1403. The network file system program 1402 then acquires the execution result of the file operation from file system program 1403 and transfers the execution result to the client 1306. In this embodiment, as a network file system program, an NFS (Network File System) or a CIFS (Common Internet File System) is assumed, for example.

When the remaining capacity of the storage device 1319 falls below a predetermined threshold value (or a predetermined threshold ratio), a migration executor 1405 of the file system program 1403 extracts those files that have not been accessed for a predetermined period from the storage device 1319, migrates the files to the backup server 1322, and generates a stub file on the storage device 1319.

The file operation executor 1404 processes the file operation from the client 1306, which is transferred from the network file system program 1402. If the target of the file operation is a stub file, the file operation executor 1404 acquires the file data corresponding to the relevant stub file from the backup server 1322. If the file operation is write processing, the file operation executor 1404 converts the stub file to a normal file using the file data acquired from the backup server 1322, and executes the write processing. If the file operation is read processing, the file operation executor 1404 transfers the file data acquired from the backup server 1322 to the network file system program 1402 (the stub file may not be converted to a normal file).

A restore executor 1406 has a function to restore a file of the file server 1316, backed up to the backup server 1338 to the storage device 1319 on the file server 1316. This function is used when a hardware failure occurs in the file server 1316, and the virtual machine image of the file server 1316 restores the files of the file server 1316 on a virtual disk using the restore executor.

—Backup Server—

Figure 17:
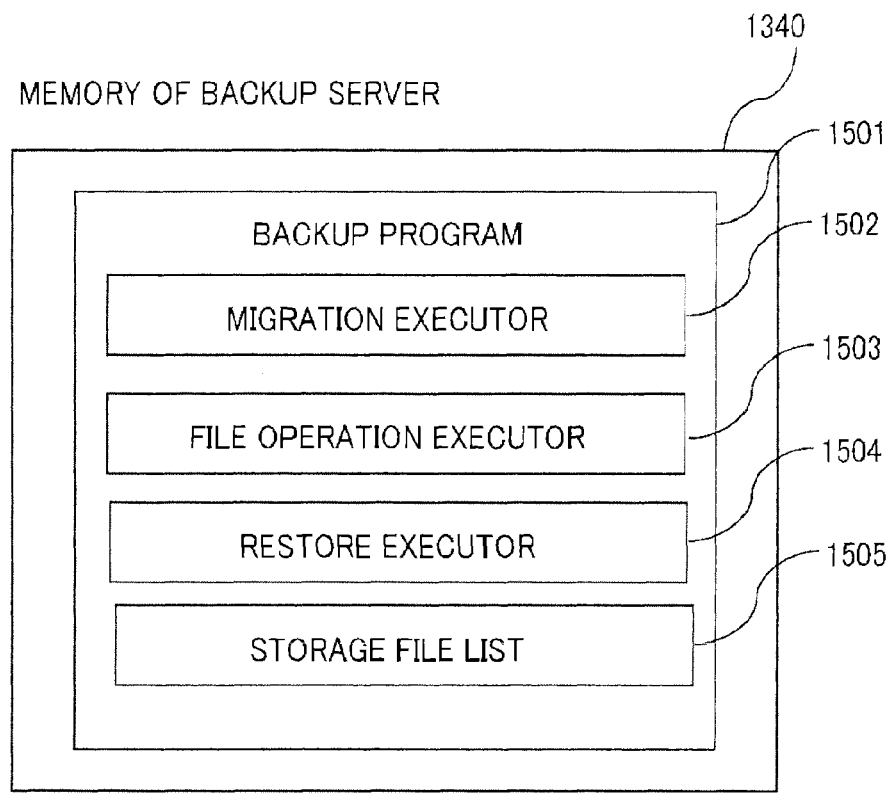
FIG. 17 is a diagram showing a software configuration of a backup server according to the embodiment.

FIG. 17 shows the configuration of the programs stored on the memory 1340 of the backup server 1338 and the data referenced by the programs. A migration processor 1502 in a backup program 1501 receives a file transmitted from a migration executor 1405, and backs up the file to the storage device 1341 of the backup server 1338.

According to a request from the file operation executor 1404, a file operation processor 1503 transmits the data of the file backed up on the storage device 1341 of the backup server 1338 to the file operation executor 1404. Also, according to a request from the file operation executor 1404, the file operation processor 1503 deletes the file backed up on the storage device 1341 of the backup server 1338.

According to a request from the restore executor 1406, a restore processor 1504 transmits the file backed up on the storage device 1341 of the backup server 1338 to the restore executor 1406.

A storage file list 1505 is a table that manages a list of files backed up to the backup server 1338 from the file server 1316.

—Virtual Machine Operation Server—

Figure 18:
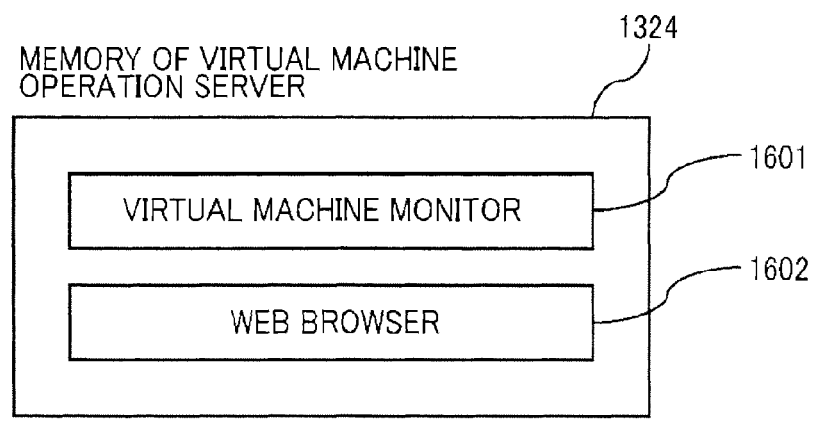
FIG. 18 is a diagram showing a software configuration of a virtual machine operation server according to the embodiment.

FIG. 18 shows the configuration of the programs stored on the memory 1324 of the virtual machine operation server 1322.

A virtual machine monitor 1601 operates similarly to the virtual machine monitor 110 in the first embodiment.

A web browser 1602 operates similarly to the web browser 109 in the first embodiment.

—Virtual Appliance Distribution Server—

Figure 19:
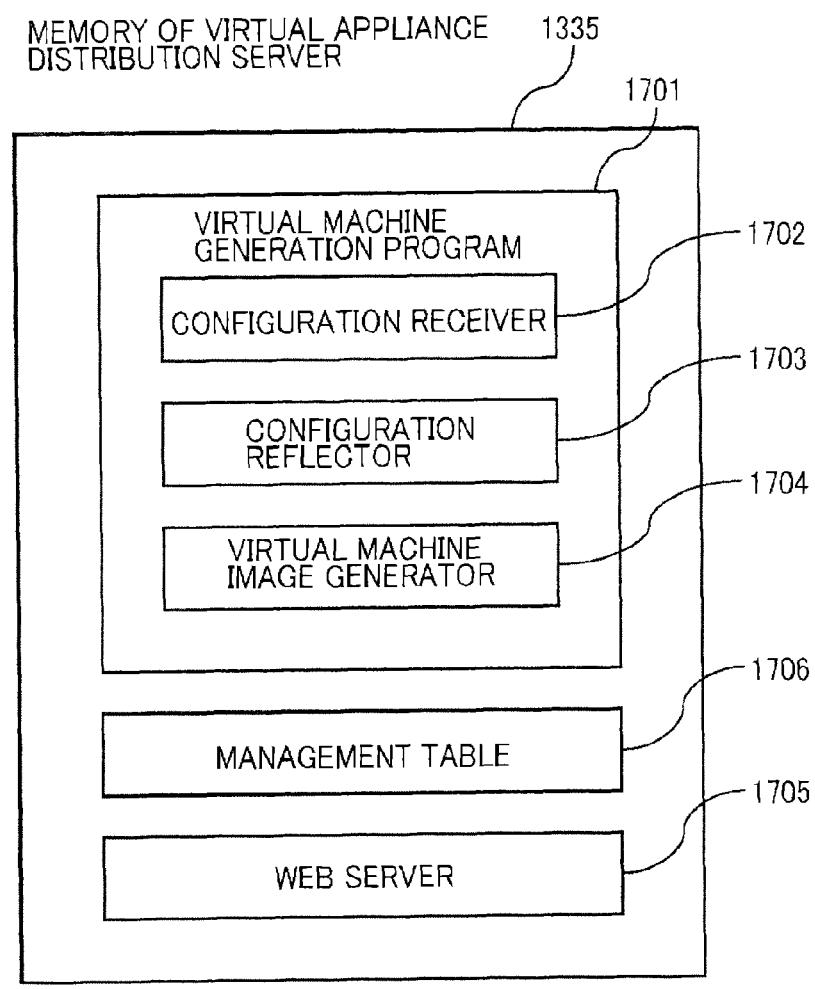
FIG. 19 is a diagram showing a software configuration of a virtual appliance distribution server according to the embodiment.

FIG. 19 shows the configuration of the programs stored in the memory 1335 of the virtual appliance distribution server 1333 and the data referenced by the programs. A virtual machine generation program 1701, and a configuration receiver 1702, a configuration reflector 1703, a virtual machine image generator 1704 in the virtual machine generation program 1701 operate similarly to the virtual machine generation program 112, the configuration receiver 113, the configuration reflector 114, and the virtual machine image generator 115 in the first embodiment, respectively. A management table 1706 is similar to the management table 406 in the first embodiment.

A web server 1705 operates similarly to the web server 116 in the first embodiment, and serves the function to upload the virtual machine image of the file server 1316 to the virtual machine operation server 1322. In addition, the web server 1705 has the function to change the capacity of the virtual disk of the virtual machine image corresponding to the file server 1316 according to a request from the system administrator.

—Migration Processing—

The migration processing executed by the migration executor 1405 is described.

Figure 20:
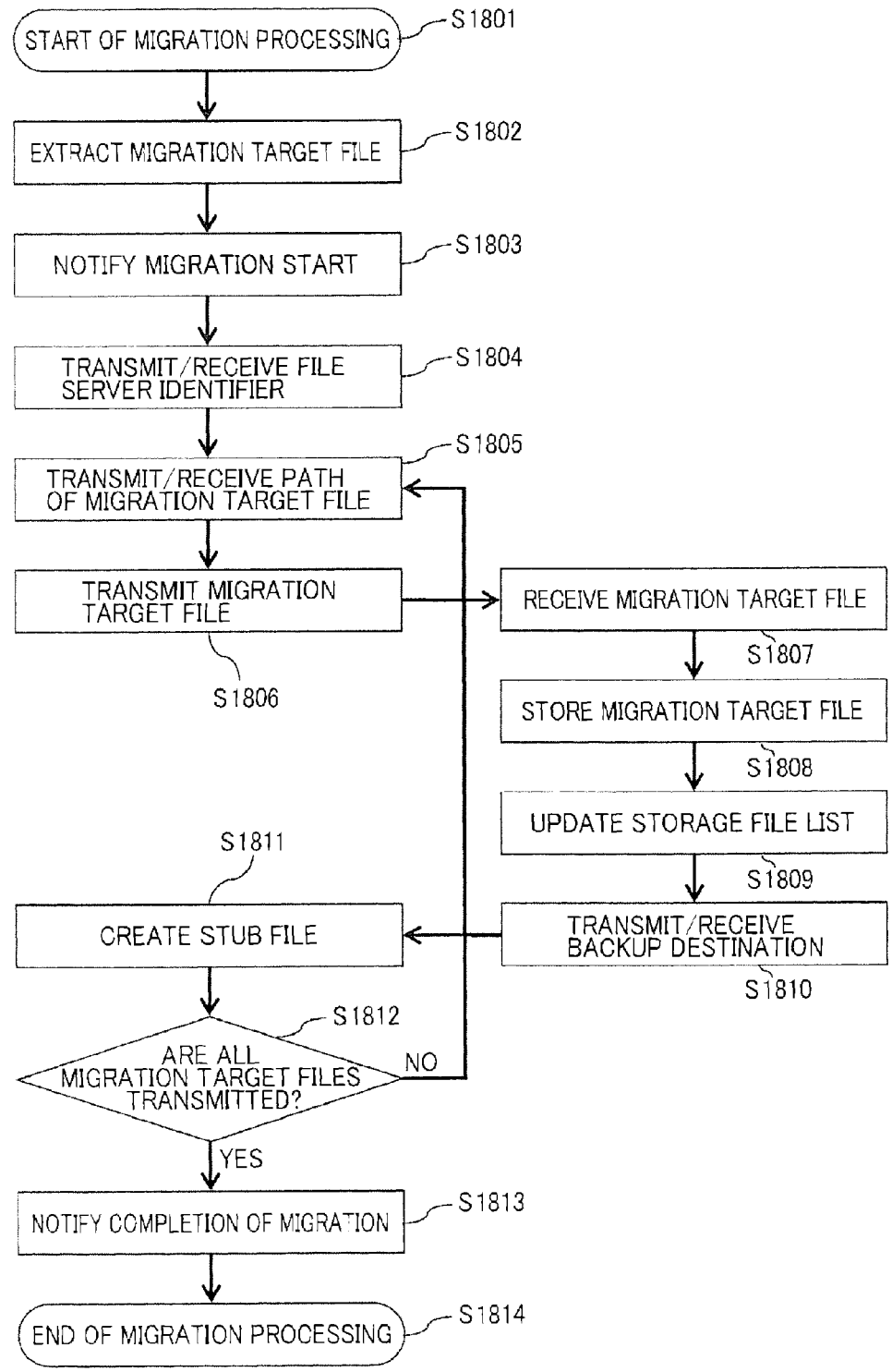
FIG. 20 is a flowchart for migration processing according to the embodiment.

FIG. 20 shows a flowchart of the migration processing.

When the remaining capacity of the storage device 1319 of the file server 1316 falls below a predetermined threshold value (or a predetermined threshold ratio), the migration executor 1405 starts the migration processing (S1801).

The migration executor 1405 scans the files on the storage device 1319 of the file server 1316 to extract those files that have not been accessed for a predetermined period as target files to be migrated (S1802).

Next, the migration executor 1405 transmits a migration start to the migration processor 1502 of the backup server 1338 (S1803).

Next, the migration executor 1405 transmits an identifier uniquely assigned to the file server 1316 to the migration processor 1502 of the backup server 1338 (S1804). The identifier of the file server 1316 is assumed to be pre-recorded in the system configuration data of the relevant file server 1338.

Next, the migration executor 1405 transmits the path of the file to be migrated (the information showing the location where the relevant file is stored in the file system constructed in the storage device 1319 of the file server 1316) to the migration processor 1502 of the backup server 1338 (S1805).

The migration executor 1405 then transmits the file corresponding to the path transmitted in S1805 to the migration processor 1502 of the backup server 1338 (S1806).

The migration processor 1502 of the backup server 1338, when receiving the file (S1807), stores the file on the storage device 1341 (S1808).

The migration processor 1502 of the backup server 1338 adds an entry of the stored file to the storage file list 1505 based on the identifier of the file server 1316 received in S1804, and the file path received in S1805 (S1809). The storage file list 1505 stores a list of files that are currently backed up by the backup server 1338.

FIG. 21 shows a schematic diagram of the storage file list 1505. A column 1902 lists the identifiers of the file servers where backed up files were originally stored. A column 1903 lists the paths on the backup server 1338 of backed up files (the location where the relevant file is stored in the file system constructed in the storage device 1341 of the backup server 1338). A column 1904 lists the paths on the file server 1316 of the relevant files.

Returning to FIG. 20, the migration processor 1502 of the backup server 1338 transmits the path on the backup server 1338 of backed up file to the migration executor 1405 of the file server 1316 (S1810).

The migration executor 1405 of the file server 1316, when receiving the path, creates a stub file by deleting the data portion of the migrated file and recording the path received in S1810 in the file data portion instead (S1811).

Figure 22:
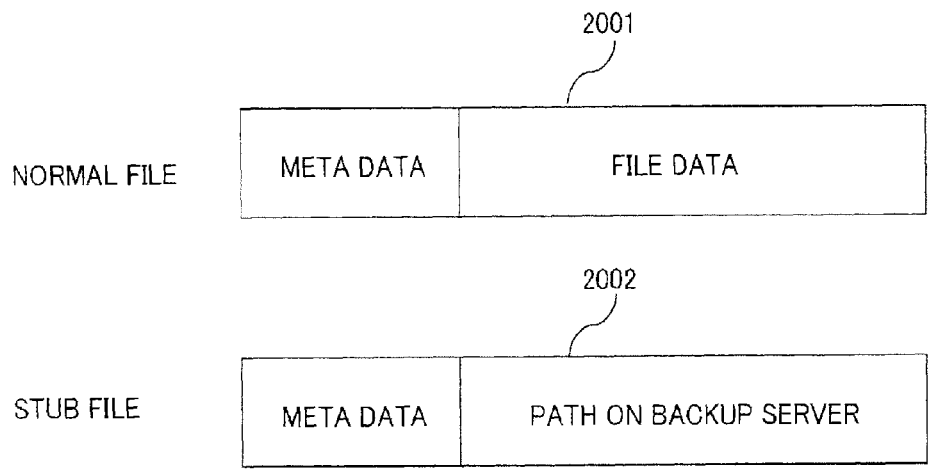
FIG. 22 is a diagram showing data configurations of a normal file and a stub file according to the embodiment.

FIG. 22 shows the data structures of a normal file and a stub file. As shown in FIG. 22, a normal file 2001 consists of: the file's metadata, in which access permissions for the file, the file size, and the like are recorded; and the file data which is the entity of the file. On the other hand, a stub file 2002 has no file data which is the entity of the file, but the backup destination (the path on the backup server 1338) of the relevant file is recorded instead.

Returning to FIG. 20, the migration executor 1405 of the file server 1316 determines whether or not all the migration target files have been transmitted to the migration processor 1502 of the backup server 1338 (S1812).

If all the files are not transmitted yet, the migration executor 1405 of the file server 1316, and the migration processor 1502 of the backup server 1338 repeat the process from S1805 to S1812 until all the files are transmitted.

On the other hand, if all the files have been transmitted, the migration executor 1405 of the file server 1316 notifies the migration processor 1502 of the backup server 1338 that the migration is completed (S1813), and terminates the migration processing (S1814).

—File Operation for Stub File—

The file operation for a stub file is described.

If the file operation for the stub file transferred from the network file system program 1402 is a write request, the file operation executor 1404 refers to the backup destination recorded in the stub file, and transmits a request for acquiring the data of the backed up file to the file operation processor 1503 of the backup server 1338. The file operation processor 1503 of the backup server 1338 transmits the data of the requested file to the file operation executor 1404 of the file server 1316.

The file operation executor 1404 acquires the data of the file to delete the information showing the backup destination recorded on the stub file, and converts the stub file to a normal file by recording the data of the received file instead. The file operation executor 1404 then executes write processing on the converted normal file, and transmits the result of the write processing to the network file system program 1402.

On the other hand, if the file operation for the stub file transferred from the network file system program 1402 is a read request, the file operation executor 1404 of the file system 1316 refers to the backup destination recorded in the stub file, and transmits a request for acquiring the data of the backed up file to the file operation processor 1503 of the backup server 1338. The file operation processor 1503 of the backup server 1338 transmits the data of the requested file to the file operation executor 1404 of the file server 1316.

The file operation executor 1404 of the file server 1316, when acquiring the data of the file, transfers the acquired data to the network file system program 1402. At this point, the stub file may not be converted to a normal file in contrast to the case of the write processing.

Also, if the file operation for the stub file transferred from the network file system program 1402 is a file delete request, the file operation executor 1404 of the file system 1316 refers to the backup destination recorded in the stub file, and requests the file operation processor 1503 of the backup server 1338 to delete the backed up file.

The file operation processor 1503 which has received the request deletes the relevant file from the storage device 1341 of the backup server 1338, and deletes the entry of the file from the storage file list 1505.

The file operation processor 1503 of the backup server 1338 then transmits a deletion completion notification of the relevant file to the file operation executor 1404 of the file server 1316.

The file operation executor 1404 of the file server 1316, when receiving the deletion completion notification of the file, deletes the relevant stub file and transmits the execution result for the deletion request to the network file system program 1402.

When a failure occurs in the file server 1316, the system administrator can recover the service similar to the one provided by the file server 1316 by executing the virtual machine image of the file server 1316, which is generated by the virtual appliance distribution server 1333, on the virtual machine monitor 1601. At this point, in order to recover the file service, the virtual machine implemented by the virtual machine operation server 1322 uses the backup file of the file server 1316 backed up in the backup server 1338. For example, specifically, the virtual machine restores the backup file of the file server 1316 from the backup server 1338 to the virtual disk 2214 so that the file service is recovered.

Thus, in this embodiment, the size of the virtual disk of the virtual machine implemented by the virtual machine operation server 1322 may be a similar size to that of the storage device 1319 of the file server 1316; however, the storage capacity of the storage device 1319 of the file server 1316 may have a huge size that is equal to or greater than several TB (terabyte).

Thus, if the virtual disk size of the virtual machine has a similar capacity to that of the storage device 1319 of the file server 1316, the capacity of the storage device 1325 included in the virtual machine operation server 1322 may be not sufficient, and thus it may become difficult to store the virtual machine image 1319 in the storage device 1325 of the virtual machine operation server 1322.

For this reason, in this embodiment, the web server 1705 is provided with a function to change the virtual disk size of the virtual machine corresponding to the file server 1316 according to the environment of the virtual machine operation server 1322.

Figure 23:
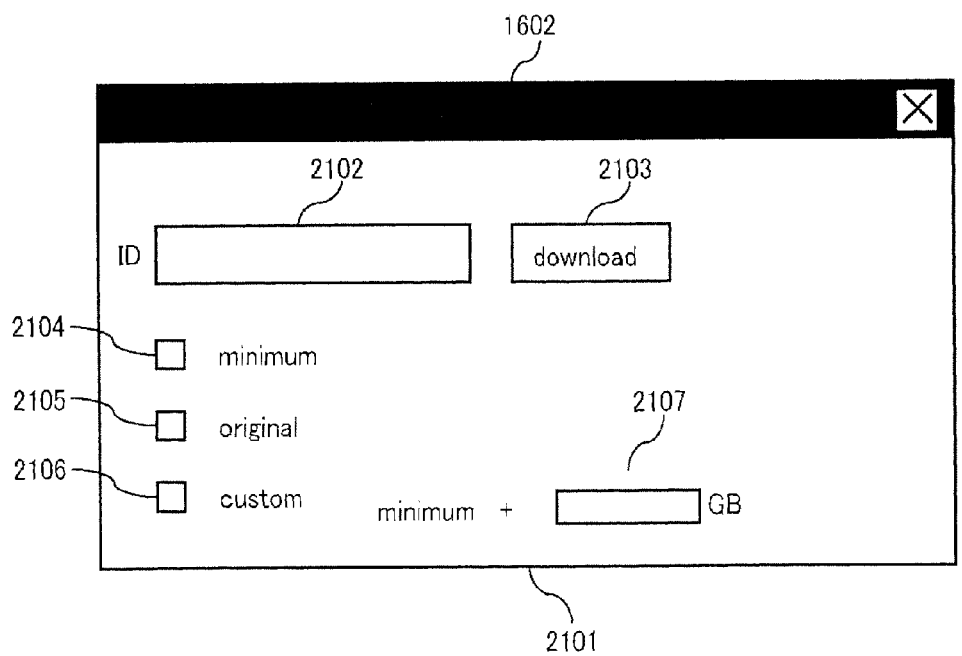
FIG. 23 is a diagram showing a download page for a virtual machine image according to the embodiment.

FIG. 23 shows a download page 2101 of the virtual machine image which the web server 1705 presents to a web browser 1602.

The identifier of the file server 1316 for downloading the virtual machine image is inputted to an input field 2102. By pressing a download button 2103, the virtual machine operation server 1322 downloads the virtual machine image corresponding to the relevant file server 1316 from the virtual appliance distribution server 1333.

At this point, if a check box 2104 labeled with "minimum" is selected (if the first allocation method is designated), the web server 1705 changes the size of the virtual disk to a size which is calculated based on the total size of the stub files for the entire backup files of the relevant file server backed up in the backup server 1338, and uploads the virtual machine image to the web browser 1602.

At this time, the web server 1705 transmits the identifier of the file server 1316 received from the web browser 1602 to the backup program 1501 of the backup server 1338. The backup program 1501 which has received the identifier refers to the received identifier and the storage file list 1505 to calculate the total size of the stub files for the entire backup files of the relevant server 1316. The size of the stub file for each file is determined as the sum of the size of the metadata of the file and the path information of the file on the backup server 1338.

The backup server 1338 then transmits the calculated total size to the web server 1705. The web server 1705 changes the size of the virtual disk based on the received total size. The size of the virtual disk in this case is defined as the virtual disk size in minimum mode.

On the other hand, if a check box 2105 labeled with "original" is selected (if the second allocation method is designated), the web server 1705 sets the size of the virtual disk to a size which is calculated based on the capacity of the storage device 1319 of the relevant file server 1316, and uploads the virtual machine image to the web browser 1602. The size of the virtual disk in this case is defined as the virtual disk size in original mode.

Also, if a numerical value is inputted to an input field 2107 and a check box 2106 labeled with "custom" is selected (if the third allocation method is designated), the web server 1705 converts the size of the virtual disk to a size which is the sum of the storage capacity in minimum mode and the storage capacity inputted to the input field 2107, and uploads the virtual machine image to the web browser 1602. The size of the virtual disk in this case is defined as the virtual disk size in custom mode.

Figure 24:
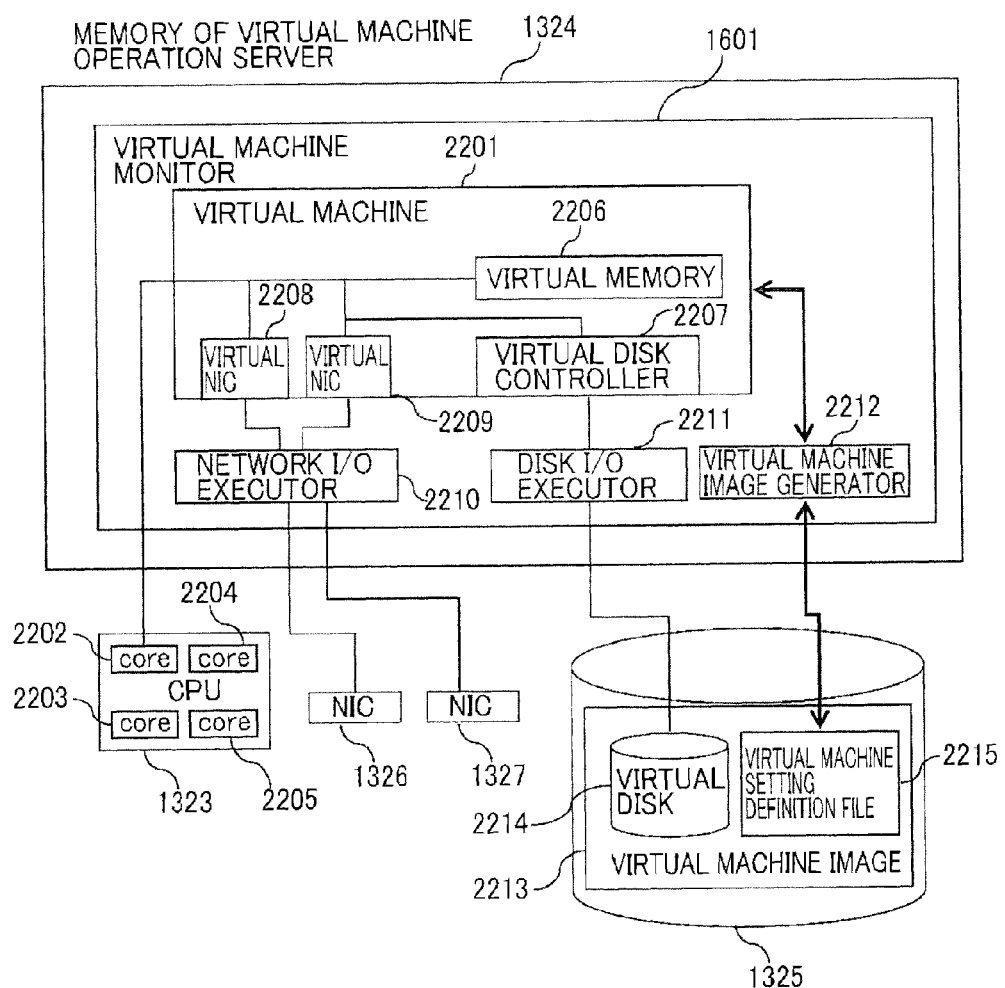
FIG. 24 is a diagram showing a virtual machine according to the embodiment.

FIG. 24 shows the setting of a virtual machine 2201 stored on the memory 1324 of the virtual machine operation server 1322 when the virtual machine monitor 1601 executes a virtual machine image 2213 corresponding to the file server 1316 downloaded from the virtual appliance distribution server 1333 and the relationship between the virtual machine 2201 and each hardware included in the virtual machine operation server 1322.

When the virtual machine monitor 1601 executes the virtual machine image 2213, the virtual machine image generator 2212 in the virtual machine monitor 1601 first reserves an area on the memory 1324 for a virtual memory 2206 where the OS and programs in the virtual disk 2214 and the data referenced by the programs are stored. In this case, the size of the virtual memory 2206 is determined according to the content of the virtual machine setting definition file 2215.

Next, the virtual machine image generator 2212 allocates a core from a CPU 1323 to the virtual machine 2201. The OS and programs on the virtual memory 2206 are executed in the core and the core is the arithmetic part of CPU. The number of cores to be allocated is determined according to the CPU setting of the virtual machine setting definition file 2215. In FIG. 24, a core 2202 is allocated to the virtual machine 2201.

Next, the virtual machine image generator 2212 allocates a virtual NIC which allows the OS and programs on the virtual memory 2206 to communicate with an external computer. The number of virtual NICs to be allocated is determined according to the CPU setting of the virtual machine setting definition file 2215. In FIG. 24, a virtual NIC 2208 and a virtual NIC 2209 are allocated to the virtual machine 2201.

The data sent from the OS and programs to each virtual NIC is transferred to a network I/O executor 2210 in the virtual machine monitor 1601. The network I/O executor 2210 refers to the destination of the sent data to transfer the data to an appropriate NIC (physical hardware).

The data sent to the virtual machine 2201 from the exterior is transferred to the network I/O executor 2210 via a NIC (physical hardware). The network I/O executor 2210 refers to the destination of the data to transfer the data to an appropriate virtual NIC.

Next, the virtual machine image generator 2212 assigns a virtual disk controller 2207 which allows the OS and programs on the virtual memory 2206 to read and write from and to the virtual disk 2214. The OS and programs on the virtual memory 2206 write data to the virtual disk 2214 via the virtual disk controller 2207. The virtual disk controller 2207 transfers a data read/write request from the OS and programs to a disk I/O executor 2211 in the virtual machine monitor 2201. The disk I/O executor 2211 processes read and write of data from and to the virtual disk 2214, and transfers the execution result to the virtual disk controller 2207.

The size of the virtual disk 2214 stored on the storage device 1325 of the virtual machine operation server 1322 varies depending on which check button is selected in the download page 2101.

If the first allocation method is selected, the virtual machine operation server 1322 allocates a storage area to the virtual machine 2201, the storage area having the storage capacity calculated based on the total data of address information showing the storage locations in the backup server 1338 of the data stored by the backup server 1338 out of the storage area of the storage device 1325 included in the virtual machine operation server 1322. That is to say, the size of the virtual disk 2214 is calculated based on the total size of the stub files for the entire backup files of the file server 1316 backed up in the backup server 1338. For example, the size is determined by adding the size of the system data to the total size of all the stub files.

In this case, the virtual machine operation server 1322, when running the virtual machine 2201, acquires the stub files for the entire data from the backup server 1338, and stores the acquired stub files in the virtual disk 2214 allocated to the virtual machine 2201.

If the second allocation method is selected, the virtual machine operation server 1322 allocates a storage area to the virtual machine 2201, the storage area having the storage capacity calculated based on that of the storage device 1319 of the file server 1316 out of the storage area of the storage device 1325 included in the virtual machine operation server 1322. That is to say, the size of the virtual disk 2214 is calculated based on the storage capacity of the storage device 1319 of the file server 1316. For example, the size is determined by adding the size of the system data to the storage capacity of the storage device 1319 of the file server 1316.

And in this case, the virtual machine operation server 1322, when running the virtual machine 2201, acquires the data stored in the backup server 1338 from the backup server 1338, and stores the acquired data in the virtual disk 2214 allocated to the virtual machine 2201 by the virtual machine operation server 1332.

If the third allocation method is selected, the virtual machine operation server 1322 allocates a storage area to the virtual machine 2201, the storage area having the storage capacity calculated by adding the input storage capacity to the total data amount of address information showing the storage locations in the backup server 1338 of the data stored by the backup server 1338 out of the storage area of the storage device 1325 included in the virtual machine operation server 1322.

In this case, the virtual machine operation server 1322, when running the virtual machine 2201, acquires the stub files for the entire data from the backup server 1338, and stores the acquired stub files in the virtual disk 2214 allocated to the virtual machine 2201.

—Virtual Machine—

Figure 25:
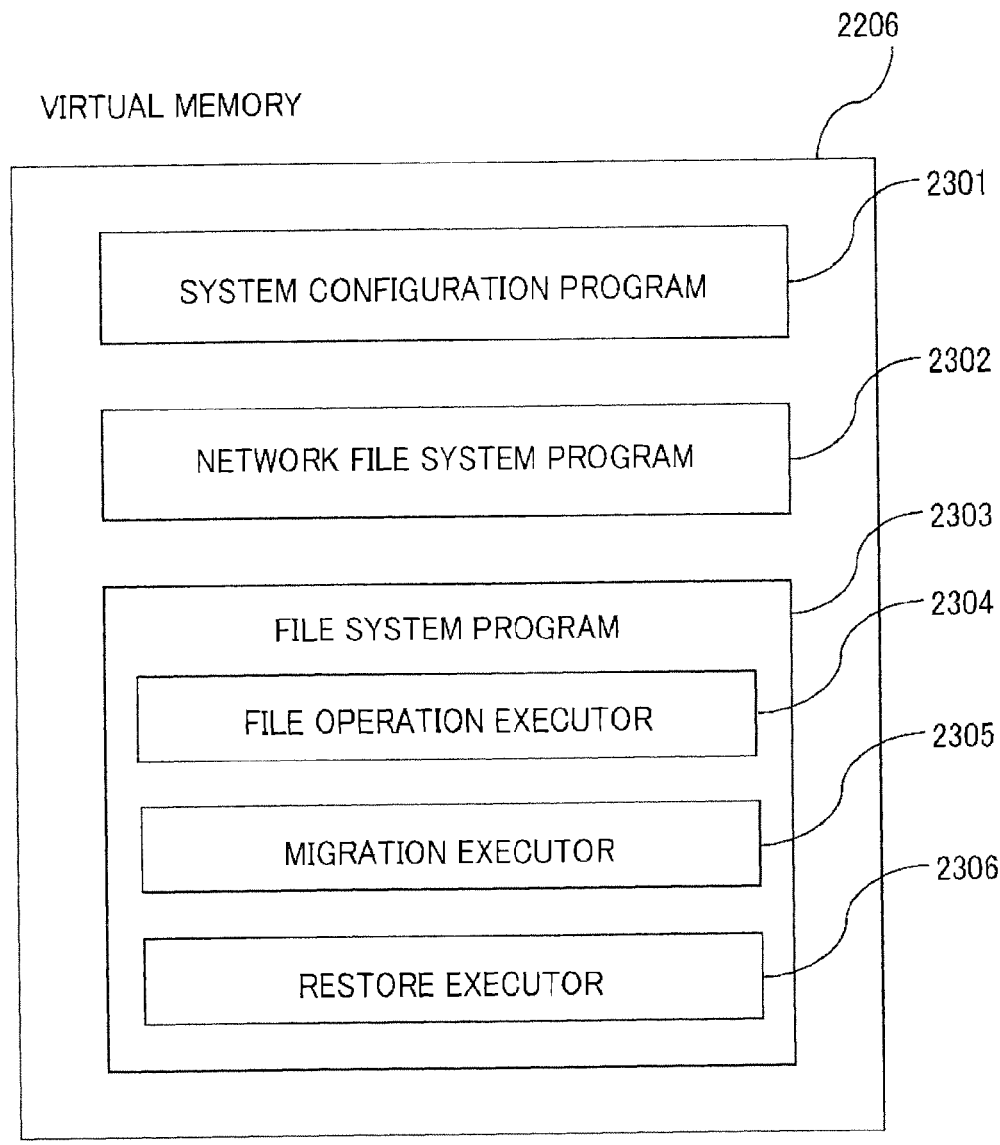
FIG. 25 is a diagram showing a configuration of a program operating on a virtual memory according to the embodiment.

FIG. 25 shows the configuration of the programs executed on the virtual memory 2206 and the data referred to by the programs.

A system configuration program 2301 operates similarly to the system configuration program 1401 stored in the memory 1318 of the file server 1316.

The network file system program 2302 operates similarly to the network file system program 1402 stored in the memory 1318 of the file server 1316. Thereby, the file service similar to the one provided by the file server 1316 is provided for the client 1306.

A file operation executor 2304 of a file system program 2303 operates similarly to the file operation executor 1404 stored in the memory 1318 of the file server 1316, and processes file operations to the files and stub files stored in the virtual disk 2214.

A migration executor 2305 operates similarly to the migration executor 1405 stored in the memory 1318 of the file server 1316, and when the remaining capacity of the virtual disk 2214 falls below a predetermined threshold value, the migration executor 2305 extracts those files that have not been accessed for a predetermined period from the files stored in the virtual disk 2214, and migrates the files to the backup server 1338.

The migration executor 2305 also has a function to migrate all the files on the virtual disk 2214 to the backup server 1338. This migration is performed when the file service by the file server 1316 is ready to be recovered, and provision of the file service using the virtual machine 2201 is stopped, and the file service using the file server 1316 is recovered (full recovery). When provision of the file service using the file server 1316 is resumed, the data migrated to the backup server 1338 is restored by the file server 1316.

A restore executor 2306 has a function to restore the backup files of the file server 1316 into the virtual disk 2214.

Figure 26:
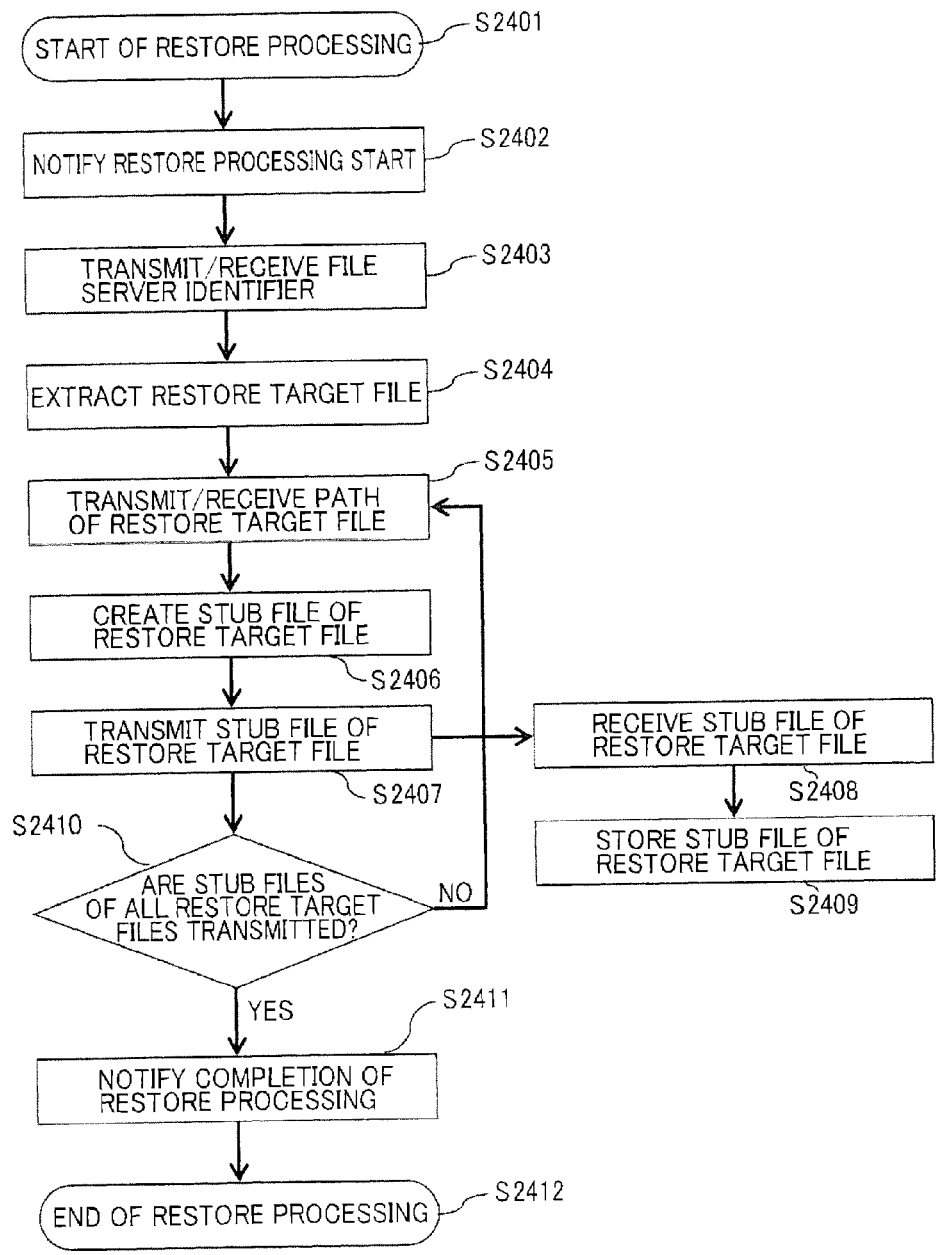
FIG. 26 is a flowchart for restore processing according to the embodiment.

The processing of restoring the backup files of the file server 1316 into the virtual disk 2214 is described. A flowchart of the restore processing is shown in FIG. 26. The restore processing is started when the system administrator logs in to the virtual machine 2201 from the management server 1301 and instructs the restore executor 2306 of the virtual machine 2201 to start restore processing (S2401).

First, the restore executor 2306 of the virtual machine 2201 notifies the restore processor 1504 of the backup server 1338 that restore processing has started (S2402).

Next, the restore executor 2306 of the virtual machine 2201 transmits the identifier of the file server 1316 to the restore processor 1504 of the backup server 1338 to notify that restoring the backup files of the file server 1316 identified by the identifier is going to start (S2403).

Next, the restore processor 1504 of the backup server 1338 receives the identifier of the file server 1316. The restore processor 1504 of the backup server 1338 then refers to the storage file list 1505, and for each of the files (the files to be restored) of the file server 1316 identified by the received identifier, the path in the file server 1316 and the path in the backup server 1338 are extracted (S2404).

Next, the restore processor 1504 of the backup server 1338 refers to the column 1904 of the storage file list 1505 for the path on the file server 1316 of the target file to be restored, and transmits the path to the restore executor 2306 of the virtual machine 2201 (S2405).

Next, the restore processor 1504 of the backup server 1338 transmits the target file to be restored to the restore executor 2306 of the virtual machine 2201. In the download page 2101 shown in FIG. 23, if the minimum mode or the custom mode is selected, the restore processor 1504 of the backup server 1338 converts the target file to be restored to a stub file (S2406), and transmits the stub file to the restore executor 2306 of the virtual machine 2201. Thereby, compared with the case where the entire target files to be restored are sent as they are, the time required for restoring the files can be reduced. Conversion to stub files is performed by the restore processor 1504 of the backup server 1338 referring to the column 1903 of the storage file list 1505.

Needless to say, when the original mode is selected in the download page 2101 shown in FIG. 23, the restore processor 1504 of the backup server 1338 transmits the file to the restore executor 2306 of the virtual machine 2201 without converting the target file to be restored to a stub file. Thereby, when the virtual machine 2201 provides file service, all the target data for the request from the client 1306 is stored on the virtual disk 2214 configured on the storage device 1325 of the virtual machine operation server 1322, and thus high-speed file service can be provided for the clients.

In the following description, the case where the minimum mode is selected in the download page 2101 shown in FIG. 23 is described as an example.

The restore executor 2306 of the virtual machine 2201, when receiving the stub file of the target file to be restored (S2408), stores the received stub file on the virtual disk 2214 (S2409). At this point, the restore executor 2306 of the virtual machine 2201 stores the received stub file at the location of the path received in S2405.

If the directory indicated by the above-mentioned path does not exist in the file system constructed on the virtual disk 2214, the restore executor 2306 of the virtual machine 2201 creates the directory indicated by the path, and stores the received stub file in the directory.

On the other hand, the restore processor 1504 of the backup server 1338 determines whether all the target files to be restored extracted in S2404 have been transmitted to the restore executor 2306 of the virtual machine 2201 or not (S2410).

If all the target files to be restored have not been transmitted, the restore processor 1504 of the backup server 1338, and the restore executor 2306 of the virtual machine repeat the process from S2405 to S2409.

If all the target files to be restored have been transmitted, the restore processor 1504 of the backup server 1338 notifies the restore executor 2306 of the virtual machine 2201 that the restore processing is completed (S2411). Thereby, the restore processing is terminated.

After the completion of the restore processing, the client 1306 can execute a file operation on any backup file of the file server 1316, which has been restored to the virtual disk 2214, via the network file system program 2302 of the virtual machine 2201.

If the size of the virtual disk 2214 is the one in the minimum mode, the virtual disk 2214 has only the capacity for storing the stub files of all the backup files. Thus, if the minimum mode is selected, the virtual machine 2201 receives only file read request from the client 1306, and transmits the target file of the read request to the client 1306. Needless to say, the virtual machine 2201 receives a write request from the client 1306, after reserving free space for writing data, for example, by deleting existing stub files on the virtual disk 2214 so that the target file for the write request can be written in the free space.

On the other hand, if the size of the virtual disk 2214 is the one in the custom mode, the client 1306 can read and write over all the backup files. With an appropriate value inputted to the input column 2107 of the download page 2101 shown in FIG. 23, all the backup files can be read and written over, while the unused storage area of the virtual disk 2214 is minimized. Accordingly, the storage area of the virtual disk 2214 can be used efficiently. Needless to say, even if the free space of the virtual disk 2214 falls below a predetermined threshold value, migration processing is executed properly to reserve new free space, and thus file write can be continued.

If the size of the virtual disk is the one in the original mode, the client 1306 can read and write over all the backup files. Also, in the case of the original mode, the performance of the file service by the virtual machine 2201 is comparable to that by the file server 1316.

Next, full recovery is described. The full recovery means that provision of the file service by the file server 1316 is ready to be recovered, and thus the file service by the virtual machine 2201 is stopped, and the file service by the file server 1316 is resumed.

This embodiment provides means to shift from temporary recovery by the virtual machine 2201 to the full recovery by the file server 1316.

At the time of the full recovery, the migration executor 2305 of the virtual machine 2201 migrates all the files on the virtual disk 2214 to the backup server 1338. The file server 1316 used for the full recovery then executes restore processing. Thereby, the file server 1316 can acquire the files that were updated by the virtual machine 2201 during the temporary recovery. Even after the full recovery, the client 1306 can access the files that were created or updated during the temporary recovery.

Figure 27:
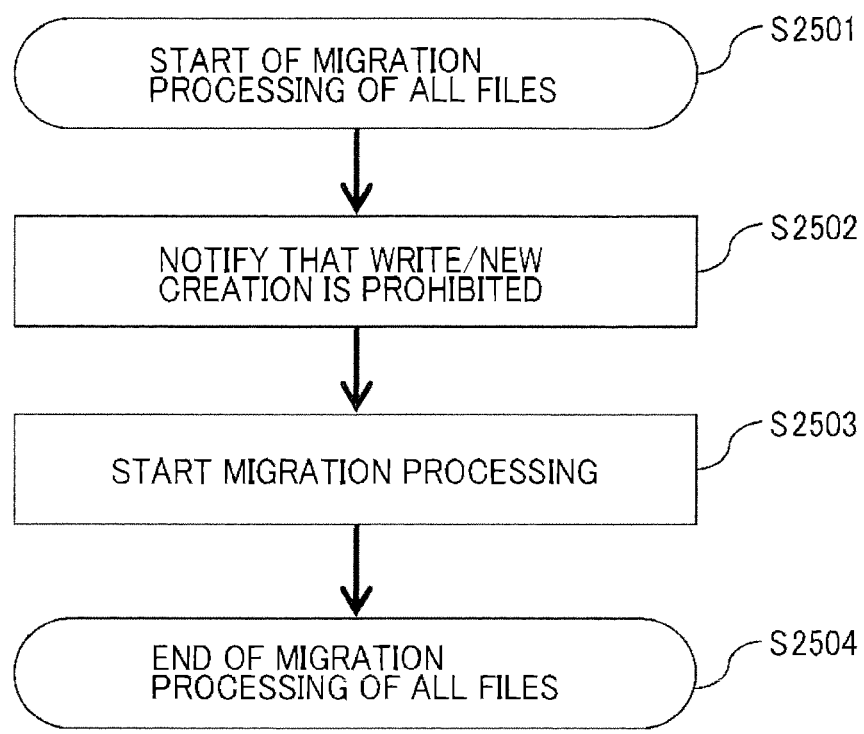
FIG. 27 is a flowchart for migration processing for all files according to the embodiment.

FIG. 27 is a flowchart of migration processing of all the files on the virtual disk 2214 to the backup server 1338 by the migration executor 2305 of the virtual machine 2201.

First, the system administrator logs in to the virtual machine 2201 from the management server 1201, and instructs the migration executor 2305 to migrate all the files (S2501).

Next, the migration executor 2305 of the virtual machine 2201 notifies the file operation executor 2304 that overwriting to any file on the virtual disk 2214 and creation of a new file thereon are prohibited (S2502). The file operation executor 2304 which has received the notification returns errors for all the subsequent file write requests and file creation requests so as to prevent file update and creation on the virtual disk 2214.

Next, the migration executor 2305 of the virtual machine 2201 transmits all the files on the virtual disk 2214 to the backup server 1338 (S2503). The migration executor 2305 of the virtual machine 2201, after transmitting all the files to the backup server 1338, terminates the processing (S2504).

After the migration of all the files is terminated, the system administrator suspends the virtual machine 2201 and activates the file server 1316 for the full recovery. The file server 1316 then executes restore processing. Thereby, the file server 1316 acquires all the files of the file server 1316 from the backup server 1338. The file server 1316 stores the acquired files in the storage device 1319.

Thereby, even after the full recovery, the client 1306 can access the files that were created or updated during the temporary recovery.

The virtual machine 2201 implemented by the virtual machine operation server 1322 may be configured to stop provision of its service after a predetermined time period after the virtual machine 2201 starts providing file service.

This configuration may be achieved, for example, by starting a timer when the virtual machine operation server 1322 runs the virtual machine 2201, so that after a predetermined time period, the function of the virtual machine 2201 is stopped by the virtual machine operation server 1322.

The predetermined time period until the function of the virtual machine 2201 is stopped may be set as a fixed value, or may be set according to the time required to recover a failure that has occurred in the file server 1316. For example, if it is expected that several hours are required to recover the file server 1316, the timer may be set to, for example, 24 hours.

In this manner, unauthorized use of the virtual machine 2201 can be prevented. For example, the case where the virtual machine image 1219 is copied to the virtual machine operation server 1322 even though a failure has not occurred in the file server 1316, and then unauthorized activation of the virtual machine 2201 causes file service to be used can be prevented.

—Flow of Entire Processing—

Next, the flow of provision of file service according to this embodiment is described with reference to the flowcharts shown in FIGS. 28 to 31.

Figure 28:
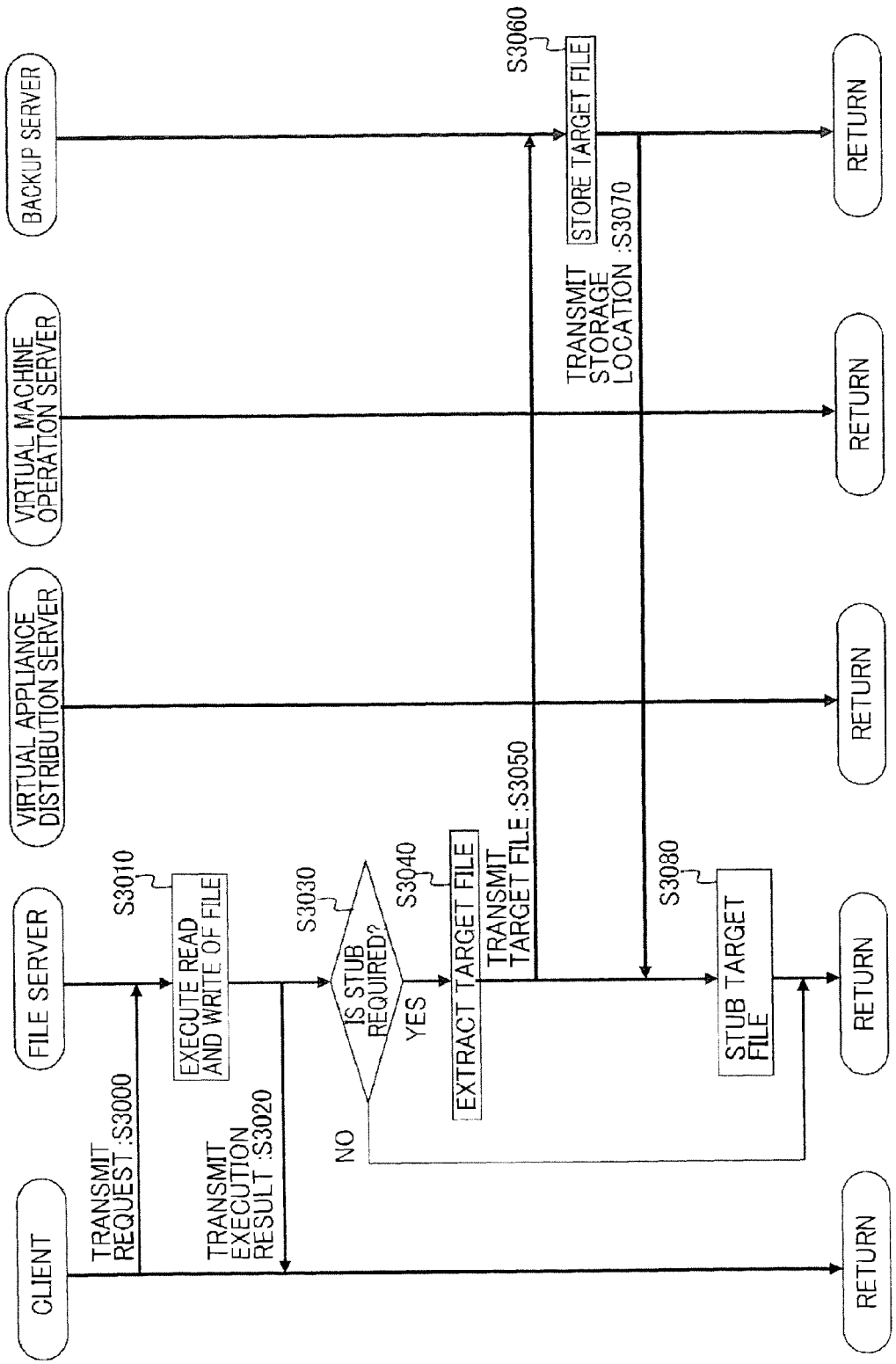
FIG. 28 is a flowchart showing a flow of information processing service according to the embodiment.

First, the flow of processing when the file server 1316 normally provides file service is described with reference to FIG. 28.

The client 1306 transmits a file access request (data input/output request) to the file server 1316 (S3000). Then, in response to the request, the file server 1316 reads, writes over, or deletes the user data 1208 stored in the storage device 1319 (S3010). The file server 1316 then transmits the execution result to the client 1306 (S3020).

On the other hand, the file server 1316 monitors free space of the storage device 1319, and if a capacity of free space of equal to or greater than a predetermined threshold value is available, determines that file stubbing is not required (S3030).

If the capacity of free space falls below a predetermined threshold value, the file server 1316 determines that file stubbing is required (S3030). In that case, the file server 1316 extracts those files that have not been accessed for a predetermined period or more from the files stored in the storage device 1319 (S3040), and migrates the extracted files to the backup server 1338 (S3050).

The backup server 1338 receives those files and stores them in the storage device 1341 (S3060). The backup server 1338 then transmits the address information showing the storage locations of those files to the file server 1316 (S3070).

The file server 1316 replaces the portions other than metadata of the extracted target file to be stubbed (body of the file) with the address information (S3080).

Figure 29:
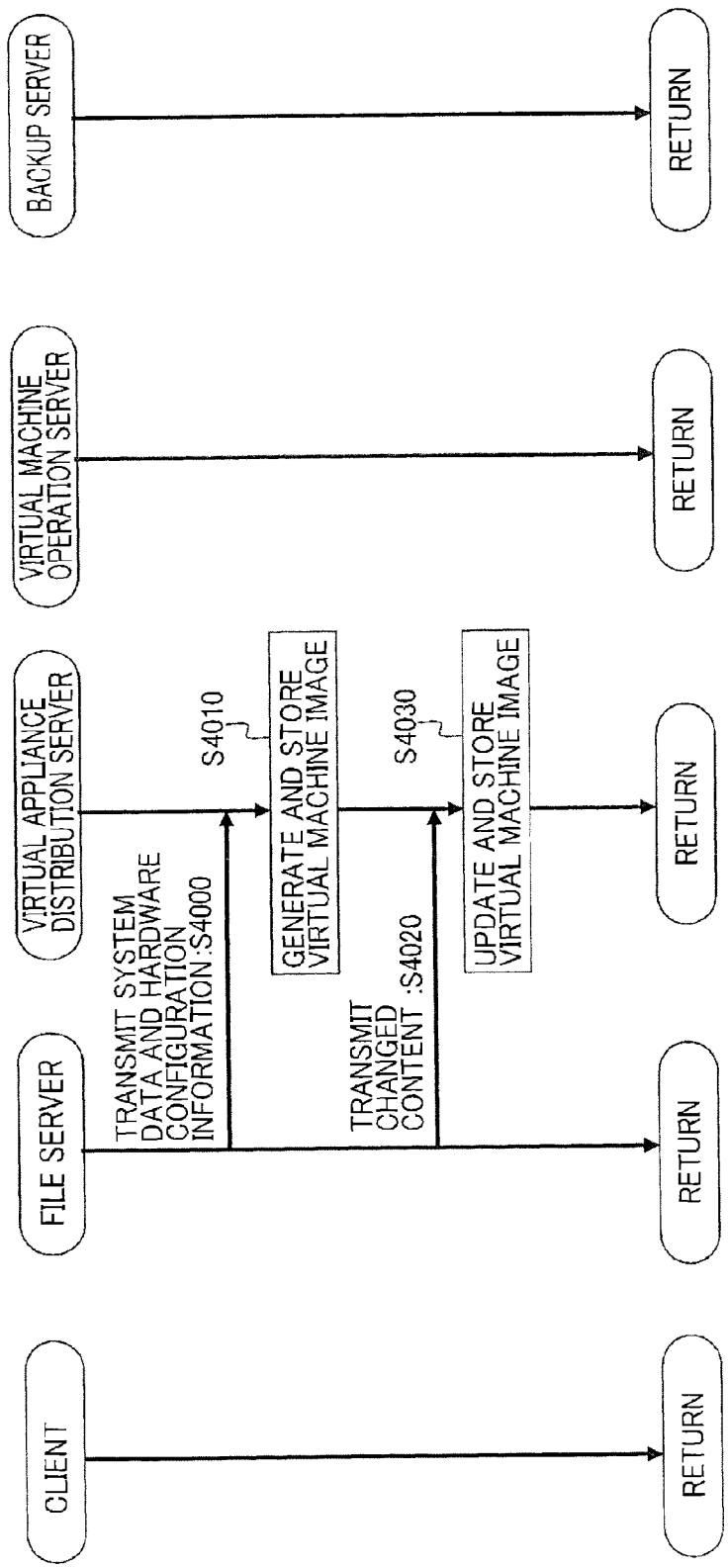
FIG. 29 is a flowchart showing a flow of generation and update of a virtual machine image according to the embodiment.

Next, the flow of generation, update processing of the virtual machine image 1219 of the file server 1316 is described with reference to FIG. 29.

The file server 1316 transmits the system data and hardware configuration information to the virtual appliance distribution server 1333 (S4000). Then, the virtual appliance distribution server 1333 generates and stores the virtual machine image 1219 of the file server 1316 based on the received system data and hardware configuration information (S4010).

At this point, as described above in detail, the virtual appliance distribution server 1333 may generate the virtual machine image 1219 of the file server 1316 based on the template 601. Alternatively, the virtual appliance distribution server 1333 may generate the virtual machine image 1219 of the file server 1316 by reading the system data and hardware configuration information recorded on recording media such as a CD or a DVD.

On the other hand, if the system data or hardware configuration information of the file server 1316 is changed, the file server 1316 transmits the changed content to the virtual appliance distribution server 1333 (S4020). Then, the virtual appliance distribution server 1333 updates the stored virtual machine image 1219 to an updated state according to the changed content. (S4030).

Figure 30:
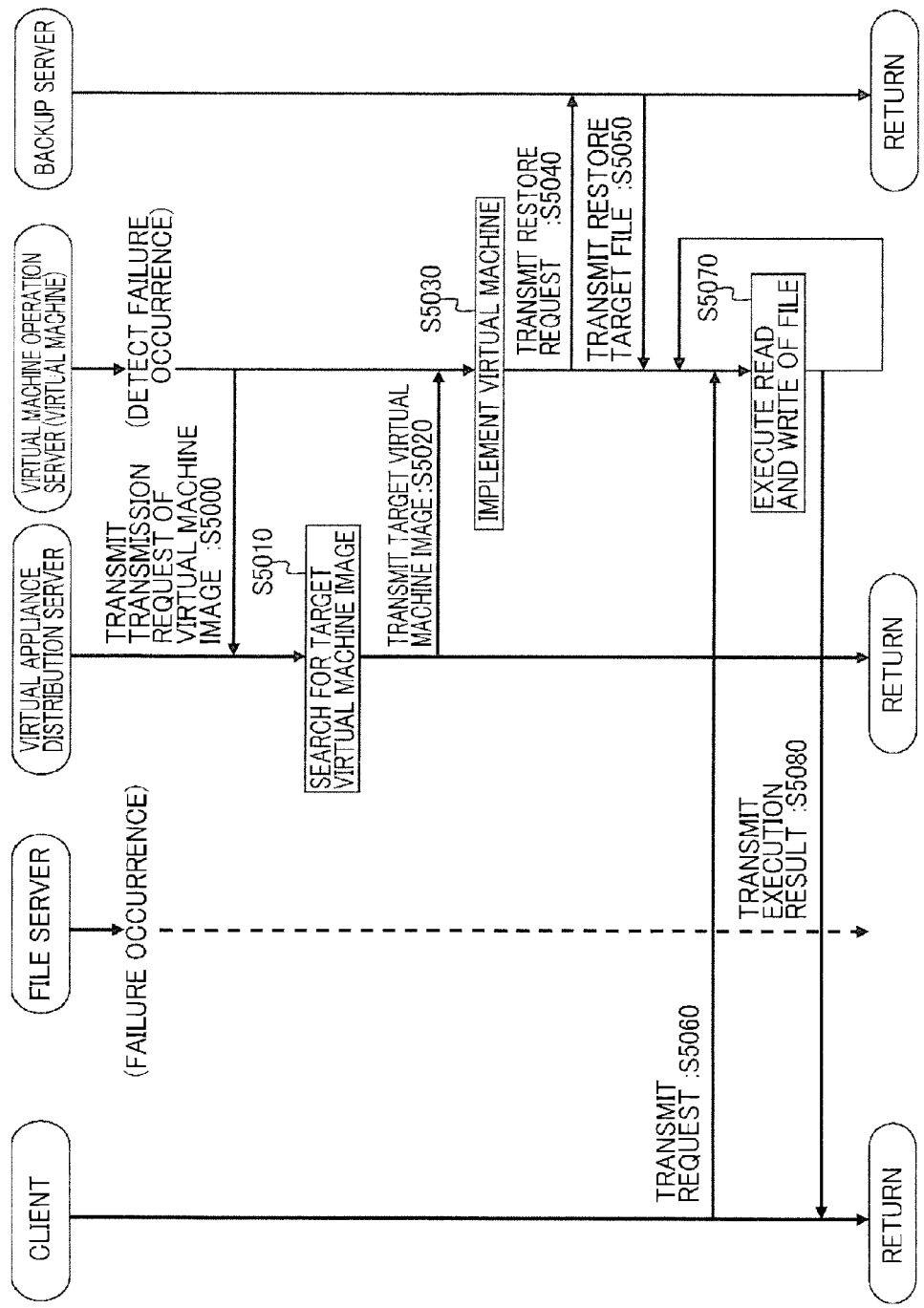
FIG. 30 is a flowchart showing a flow of information processing service when a failure occurs according to the embodiment.

Next, the flow of processing when a failure occurs in the file server 1316, and the file service by the file server 1316 cannot be provided is described with reference to FIG. 30.

When a failure occurs in the file server 1316, for example, the system administrator operates the virtual machine operation server 1322 to transmit a transmission request of a virtual machine image from the virtual machine operation server 1322 to the virtual appliance distribution server 1333 (S5000). Then, the virtual appliance distribution server 1333 searches for the relevant virtual machine image 1219 (S5010), and transmits it to the virtual machine operation server 1322 (S5020).

The virtual machine operation server 1322 runs the virtual machine 2201 according to the acquired virtual machine image 1219 (S5030). At this point, the virtual machine operation server 1322 transmits a restore request to the backup server 1338 (S5040). Then, the backup server 1338 reads the target file to be restored from the storage device 1341, and transmits it to the virtual machine operation server 1322 (S5050).

Subsequently, when receiving a request from the client 1306 (S5060), the virtual machine 2201 implemented by the virtual machine operation server 1322 reads or writes over data of the target file of the request (S5070). The virtual machine 2201 then transmits the execution result to the client 1306 (S5080).

Here, acquisition of the virtual machine image 1219 from the virtual appliance distribution server 1333 by the virtual machine operation server 1322 can be made, for example, by the virtual machine operation server 1322 reading the virtual machine image 1219 recorded on recording media such as a CD or a DVD.

Figure 31:
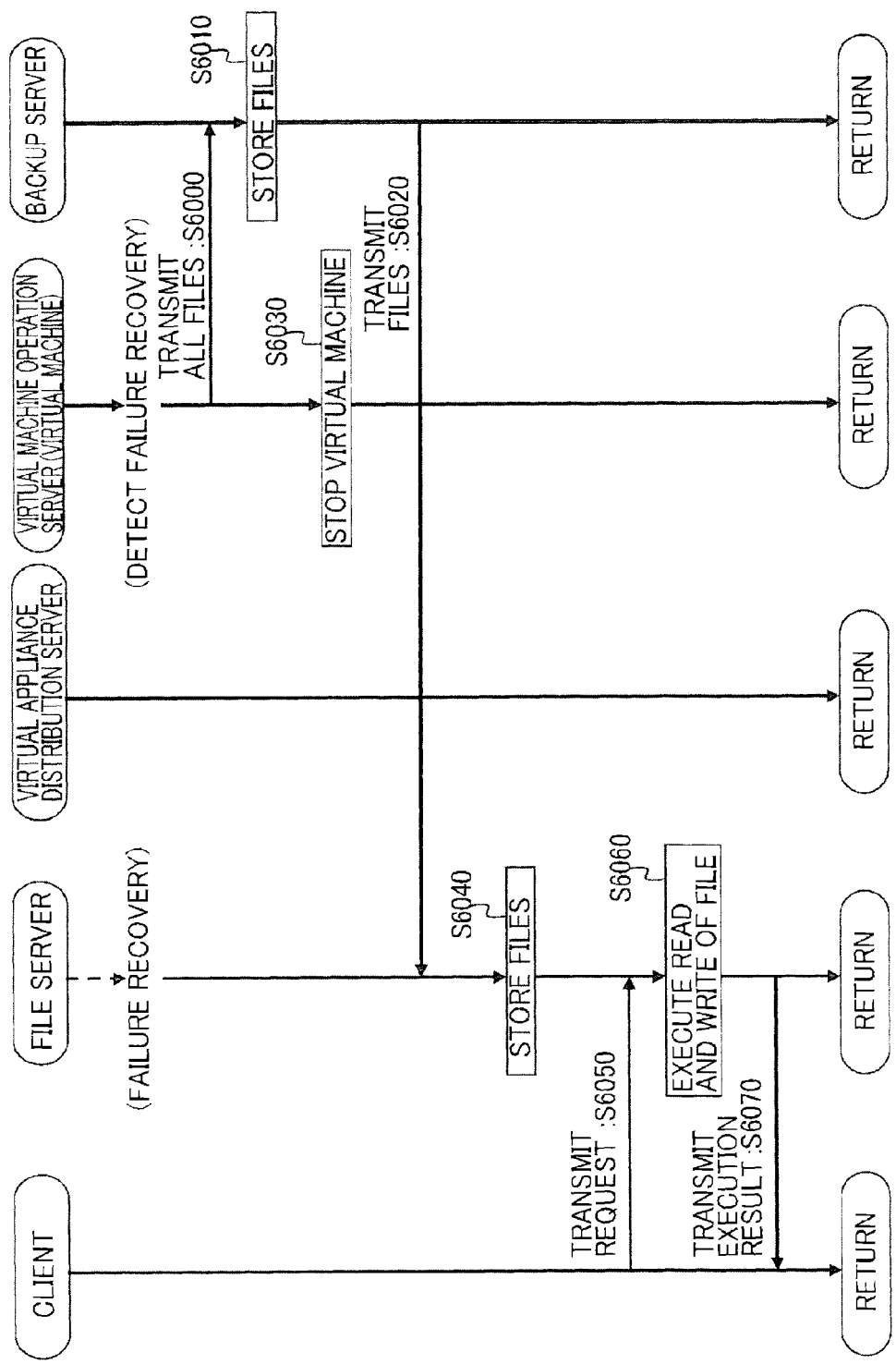
FIG. 31 is a flowchart showing a flow of recovering information processing service from failure according to the embodiment.

Next, the flow of processing when a failure that occurred in the file server 1316 is recovered, and the provision of the file service by the file server 1316 is resumed is described with reference to FIG. 31.

When the failure that occurred in the file server 1316 is recovered, for example, the system administrator operates the virtual machine 2201 to transmit all the files on the virtual disk 2214 from the virtual machine 2201 to the backup server 1338 (S6000). The backup server 1338 stores all the received files in the storage device 1341 (S6010).

The virtual machine operation server 1322 then stops the function of the virtual machine 2201 (S6030).

On the other hand, the file server 1316 transmits a restore request of all the files to the backup server 1338. In response to the restore request, the backup server 1338 transmits all the target files to be restored to the file server 1316 (S6020). The file server 1316, when receiving the target files to be restored, stores the files in the storage device 1319 (S6040).

Subsequently, when receiving a request from the client 1306 (S6050), the file server 1316 reads or writes over data of the target file of the request (S6060). The file server 1316 then transmits the execution result to the client 1306 (S6070).

As described above, in this embodiment, the virtual machine image 1219 of the file server 1316 which provides file service is stored in the virtual appliance distribution server 1333. When a failure occurs in the file service, the virtual machine 2201 which provides the function of the file service based on the virtual machine image 1219 is implemented so that the file service, in which a failure occurs, can be immediately recovered without clustering the file servers 1316 which provide the file service. Thereby, a time period, in which users are unable to access the files, can be reduced.

Also, in the case where the system or hardware configuration of the file server 1316 is changed, the file server 1316 transmits the content of the change to the virtual appliance distribution server 1333, which updates the virtual machine image 1219 according to the content of the change. Thereby, if a failure occurs in the file server 1316, the virtual machine 2201 reproducing the file server 1316 in the latest state immediately before the failure can be implemented. Accordingly, the client 1306 can access the provided service similar to the information processing service before the failure even after the occurrence of the failure of the file server 1316.

Also, a transmission of the virtual machine image 1219 from the virtual appliance distribution server 1333 to the virtual machine operation server 1322 is made according to a request from the web browser 1602 of the virtual machine operation server 1322 so that if a failure occurs in the file server 1316, the provision of the file service to the client 1306 can be stopped, for example, at the discretion of the system administrator.

Alternatively, if a failure occurs in the file server 1316, at the discretion of the system administrator, the virtual machine image 1219 of the file server 1316, which can provide a different service from the file service provided by the file server 1316 involved in a failure (for example, the file service is provided while informing the users that the system is in a special operation due to a failure occurrence), is downloaded to the virtual machine operation server 1322 to implement the virtual machine 2201 so that the file service can be provided for the client 1306.

As described above, this embodiment provides means for temporary early detection of the service provided by the server when a hardware failure occurs in the server.

Also, in this embodiment, a virtual appliance distribution server having a function to distribute the virtual machine image of the service providing server via a network is provided. This virtual appliance distribution server pre-stores virtual machine images including the virtual disks, in which the OS, the system configuration data, programs, content data, and other data similar to those of the service providing server are stored.

In this embodiment, the service providing server is equipped with a function to transmit the system configuration information of the relevant server and the system configuration update to a virtual appliance distribution server. The virtual appliance distribution server is equipped with a function to reflect the received system configuration information to the system configuration data stored in the virtual disks of the virtual machine images.

With the above-mentioned functions, the virtual machine images having the OS, the system configuration data, programs, content data, and other data similar to those of the service providing server can be downloaded from the virtual appliance distribution server via a network. Also, the virtual appliance distribution server makes it possible to distribute the virtual machine images corresponding to many servers via a network.

According to this embodiment, when a hardware failure occurs in a service providing server, the users utilizing the server can download virtual machine images from the virtual appliance distribution server, the virtual machine images having the OS, the system configuration data, programs, content data, and other data similar to those of the server, and execute the downloaded virtual machine images on any physical server in which the virtual machine monitor operates so that the service can be recovered early temporarily.

By downloading the virtual server having the OS, the system configuration data, programs, content data, and other data similar to those of the server from the virtual appliance distribution server, and executing them, the service can be recovered early temporarily without procurement of alternative hardware, installation of the server OS, and reconfiguration of the system.

Because the server for service recovery is distributed as a virtual machine image, a special standby server is not required to be installed as in the case with clustering technology, thus the service can be recovered early by using the existing server, and the cost for introducing devices is reduced compared with the clustering technology.

Also, because the virtual machine image is activated only when a failure occurs, the running cost can be reduced compared with the clustering technology where a standby server is constantly in operation.

Moreover, because the service is not required to be maintained by two or more servers all the time as in the case with the clustering technology, clustering software is not required to be installed or the like, and thus the management cost can be reduced.

Although the preferred embodiments of the present invention have been described above, these are for illustrative purposes to describe the invention, and are not intended to limit the scope of the invention to the embodiments. The present invention can be practiced in various other forms.

REFERENCE SIGNS LIST

103 Service providing server
108 Virtual machine operation server
110 Virtual machine monitor
111 Virtual appliance distribution server
118 Virtual machine image
1000 Information processing system
1010 Information processing system
1316 File server
1322 Virtual machine operation server
1333 Virtual appliance distribution server
1338 Backup server

The invention claimed is:

1. A failure recovery method for an information processing service provided by an information apparatus, the method comprising:

providing a virtual machine image generation apparatus coupled to the information apparatus, and a virtual machine execution apparatus coupled to the virtual machine image generation apparatus;

generating and storing, by the virtual machine image generation apparatus, a virtual machine image based on system data and hardware configuration information which enable implementation of the information processing service at a time of normal operation of the information processing service;

when a content of the system data and the hardware configuration information is changed, transmitting, by the information apparatus, the changed content to the virtual machine image generation apparatus;

updating, by the virtual machine image generation apparatus, the stored virtual machine image to a changed virtual machine image according to the changed content;

when a failure occurs in the information processing service, acquiring, by the virtual machine execution apparatus, the virtual machine image from the virtual machine image generation apparatus, providing hardware resources to the virtual machine; and implementing, by the virtual machine execution apparatus, the virtual machine which provides the function of the information processing service by emulating the information apparatus based on the acquired virtual machine image.

2. The failure recovery method for an information processing service according to claim 1, wherein the acquiring of the virtual machine image from the virtual machine image generation apparatus by the virtual machine execution apparatus comprises:

transmitting a transmission request for the virtual machine image to the virtual machine image generation apparatus from the virtual machine execution apparatus, at a time of inputting an acquisition request of the virtual machine image, when a failure occurs in the information processing service, and transmitting the stored virtual machine image to the virtual machine execution apparatus from the virtual machine image generation apparatus in response to the transmission request.

3. The failure recovery method for an information processing service according to claim 1, wherein in the virtual machine image generation apparatus, the virtual machine images of a plurality of the information apparatuses are stored in association with identification information of the respective information apparatuses, and the acquisition of the virtual machine image from the virtual machine image generation apparatus by the virtual machine execution apparatus comprises:

when a failure occurs in the information processing service, transmitting a transmission request of the virtual machine image to the virtual machine image generation apparatus from the virtual machine execution apparatus by designating identification information of the information apparatus having the failure in the information processing service, at a time of inputting an acquisition request of the virtual machine image designating the identification information of the information apparatus, and transmitting the virtual machine image to the virtual machine execution apparatus from the virtual machine image generation apparatus, the virtual machine image being stored in association with the identification information designated by the transmission request.

4. The failure recovery method for an information processing service according to claim 1, wherein the information apparatus provides as the information processing service a service of receiving a data input/output request from a service utilizing apparatus communicatively coupled with the information apparatus, reading and writing data from and to a recording medium included in the information apparatus according to the data input/output request, and transmitting an execution result to the service utilizing apparatus, the recording medium included in the information apparatus includes a first storage area in which the data targeted for reading and writing is stored, and a second storage area in which the system data and the hardware configuration information that enable implementation of the information processing service by the information apparatus are stored, the virtual machine execution apparatus is communicatively coupled with a backup apparatus which stores replicated data of data recorded in the first storage area, and the virtual machine provides the information processing service by reading and writing over the replicated data stored in the backup apparatus according to the data input/output request received from the service utilizing apparatus.

5. The failure recovery method for an information processing service according to claim 4, wherein the virtual machine execution apparatus receives an input designating a method of allocating a storage area to the virtual machine, the storage area being used when the virtual machine reads and writes data according to the data input/output request, when a first allocation method is designated, the virtual machine execution apparatus allocates a storage area of a part of a storage area of a recording medium included in the virtual machine execution apparatus to the virtual machine when running the virtual machine, the allocated storage area having a storage capacity calculated based on a total data amount of address information showing each storage location in the backup apparatus of the replicated data stored by the backup apparatus, when a second allocation method is designated, the virtual machine execution apparatus allocates a storage area of a part of the storage area of the recording medium included in the virtual machine execution apparatus to the virtual machine when running the virtual machine, the allocated storage area having a storage capacity calculated based on a storage capacity of the recording medium included in the information apparatus, and when a third allocation method is designated, the virtual machine execution apparatus further receives an input to designate a storage capacity to be allocated to the virtual machine, and allocates a storage area of a part of the storage area of the recording medium included in the virtual machine execution apparatus to the virtual machine when running the virtual machine, the allocated storage area having a sum of the designated storage capacity and a storage capacity calculated based on a total data amount of the address information showing each storage location in the backup apparatus of the replicated data stored by the backup apparatus.

6. The failure recovery method for an information processing service according to claim 5, wherein when the first allocation method is designated, the virtual machine execution apparatus acquires the address information showing each storage location of the replicated data in the backup apparatus from the backup apparatus when running the virtual machine, the virtual machine execution apparatus stores the acquired address information in the storage area allocated to the virtual machine by the virtual machine execution apparatus, and the virtual machine accepts only a data input request out of the data input/output requests received from the service utilizing apparatus, identifies a storage location of target data of the data input request in the backup apparatus in reference to the address information, and provides the information processing service by reading the data stored at the identified storage location.

7. The failure recovery method for an information processing service according to claim 5, wherein when the second allocation method is designated, the virtual machine execution apparatus acquires the replicated data stored in the backup apparatus from the backup apparatus when running the virtual machine, the virtual machine execution apparatus stores the acquired replicated data in the storage area allocated to the virtual machine by the virtual machine execution apparatus, and the virtual machine provides the information processing service by reading and writing over the replicated data stored in the storage area according to the data input/output request received from the service utilizing apparatus.

8. The failure recovery method for an information processing service according to claim 5, wherein when the third allocation method is designated, the virtual machine execution apparatus acquires address information showing each storage location of the replicated data in the backup apparatus from the backup apparatus when running the virtual machine, the virtual machine execution apparatus stores the acquired address information in the storage area allocated to the virtual machine by the virtual machine execution apparatus, and the virtual machine provides the information processing service in response to a data input request out of the data input/output requests received from the service utilizing apparatus by identifying a storage location of target data of the data input request in the backup apparatus in reference to the address information, and by reading the data stored at the storage location thus identified, and provides the information processing service in response to a data output request, by writing target data of the data output request to the storage area allocated to the virtual machine.

9. The failure recovery method for an information processing service according to claim 4, wherein when the information processing service by the information apparatus is recovered from failure, the information apparatus acquires data stored in the backup apparatus from the backup apparatus, the information apparatus stores the acquired data in the first storage area of the recording medium included in the information apparatus, and the information apparatus provides the information processing service by reading and writing over the data stored in the first storage area according to the data input/output request received from the service utilizing apparatus.

10. The failure recovery method for an information processing service according to claim 1, wherein the virtual machine execution apparatus stops the virtual machine from providing the information processing service when a predetermined time period passes after start of the provision of the information processing service by the virtual machine.

11. The failure recovery method for an information processing service according to claim 1, wherein the acquiring of the virtual machine image from the virtual machine image generation apparatus by the virtual machine execution apparatus includes:

transmitting a transmission request for the virtual machine image to the virtual machine image generation apparatus from the virtual machine execution apparatus, when a failure occurs in the information processing service, and transmitting the stored virtual machine image to the virtual machine execution apparatus from the virtual machine image generation apparatus in response to the transmission request, wherein when, in the virtual machine image generation apparatus, the virtual machine images of a plurality of the information apparatuses are stored in association with identification information of the respective information apparatuses, the acquisition of the virtual machine image from the virtual machine image generation apparatus by the virtual machine execution apparatus includes:

when a failure occurs in the information processing service, transmitting a transmission request of the virtual machine image to the virtual machine image generation apparatus from the virtual machine execution apparatus by designating identification information of the information apparatus having the failure in the information processing service, and transmitting the virtual machine image to the virtual machine execution apparatus from the virtual machine image generation apparatus, the virtual machine image being stored in association with the identification information designated by the transmission request, wherein the information apparatus provides as the information processing service a service of receiving a data input/output request from a service utilizing apparatus communicatively coupled with the information apparatus, reading and writing data from and to a recording medium included in the information apparatus according to the data input/output request, and transmitting an execution result to the service utilizing apparatus, the recording medium included in the information apparatus includes a first storage area in which the data targeted for reading and writing is stored, and a second storage area in which the system data and the hardware configuration information that enable implementation of the information processing service by the information apparatus are stored, and when the virtual machine execution apparatus is communicatively coupled with a backup apparatus which stores replicated data of data recorded in the first storage area, the virtual machine provides the information processing service by reading and writing over the replicated data stored in the backup apparatus according to the data input/output request received from the service utilizing apparatus, wherein when the virtual machine execution apparatus receives an input designating a method of allocating a storage area to the virtual machine, the storage area being used when the virtual machine reads and writes data according to the data input/output request, in response to a designation of a first allocation method, the virtual machine execution apparatus allocates a storage area of a part of a storage area of a recording medium included in the virtual machine execution apparatus to the virtual machine when running the virtual machine, the allocated storage area having a storage capacity calculated based on a total data amount of address information showing each storage location in the backup apparatus of the replicated data stored by the backup apparatus;

in response to a designation of a second allocation method, the virtual machine execution apparatus allocates a storage area of a part of the storage area of the recording medium included in the virtual machine execution apparatus to the virtual machine when running the virtual machine, the allocated storage area having a storage capacity calculated based on a storage capacity of the recording medium included in the information apparatus, and in response to a designation of a third allocation method, the virtual machine execution apparatus further receives an input to designate a storage capacity to be allocated to the virtual machine, and allocates a storage area of a part of the storage area of the recording medium included in the virtual machine execution apparatus to the virtual machine when running the virtual machine, the allocated storage area having a sum of the designated storage capacity and a storage capacity calculated based on a total data amount of the address information showing each storage location in the backup apparatus of the replicated data stored by the backup apparatus, wherein when the first allocation method is designated, the virtual machine execution apparatus acquires the address information showing each storage location of the replicated data in the backup apparatus from the backup apparatus when running the virtual machine, the virtual machine execution apparatus stores the acquired address information in the storage area allocated to the virtual machine by the virtual machine execution apparatus, and the virtual machine accepts only a data input request out of the data input/output requests received from the service utilizing apparatus, identifies a storage location of target data of the data input request in the backup apparatus in reference to the address information, and provides the information processing service by reading the data stored at the identified storage location, wherein when the second allocation method is designated, the virtual machine execution apparatus acquires the replicated data stored in the backup apparatus from the backup apparatus when running the virtual machine, the virtual machine execution apparatus stores the acquired replicated data in the storage area allocated to the virtual machine by the virtual machine execution apparatus, and the virtual machine provides the information processing service by reading and writing over the replicated data stored in the storage area according to the data input/output request received from the service utilizing apparatus, wherein when the third allocation method is designated, the virtual machine execution apparatus acquires address information showing each storage location of the replicated data in the backup apparatus from the backup apparatus when running the virtual machine, the virtual machine execution apparatus stores the acquired address information in the storage area allocated to the virtual machine by the virtual machine execution apparatus, and the virtual machine provides the information processing service in response to a data input request out of the data input/output requests received from the service utilizing apparatus by identifying a storage location of target data of the data input request in the backup apparatus in reference to the address information, and by reading the data stored at the storage location thus identified, and provides the information processing service in response to a data output request, by writing target data of the data output request to the storage area allocated to the virtual machine, wherein the virtual machine execution apparatus stops the virtual machine from providing the information processing service when a predetermined time period passes after start of the provision of the information processing service by the virtual machine, wherein when the information processing service by the information apparatus is recovered from failure, the information apparatus acquires data stored in the backup apparatus from the backup apparatus, the information apparatus stores the acquired data in the first storage area of the recording medium included in the information apparatus, and the information apparatus provides the information processing service by reading and writing over the data stored in the first storage area according to the data input/output request received from the service utilizing apparatus.

* * * * *